United States Patent
Matsuda

(10) Patent No.: US 8,405,838 B2
(45) Date of Patent: Mar. 26, 2013

(54) IMAGE PROCESSING DEVICE, IMAGE PROCESSING METHOD, AND INFORMATION RECORDING MEDIUM

(75) Inventor: Kohji Matsuda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1363 days.

(21) Appl. No.: 11/714,880

(22) Filed: Mar. 7, 2007

(65) Prior Publication Data

US 2007/0285708 A1 Dec. 13, 2007

(30) Foreign Application Priority Data

Mar. 30, 2006 (JP) ................................. 2006-094902

(51) Int. Cl.
*G06F 15/00* (2006.01)
(52) U.S. Cl. ..................... 358/1.13; 358/1.15; 358/1.16; 358/3.28; 358/296
(58) Field of Classification Search ................. 358/1.13, 358/1.15, 1.16, 3.28, 296; 400/76
See application file for complete search history.

(56) References Cited

U.S. PATENT DOCUMENTS

| | | | | |
|---|---|---|---|---|
| 5,687,332 | A * | 11/1997 | Kurahashi et al. | 715/706 |
| 6,502,147 | B2 * | 12/2002 | Reilly | 710/104 |
| 6,714,205 | B1 * | 3/2004 | Miyashita et al. | 345/536 |
| 2001/0008449 | A1 | 7/2001 | Okada | |
| 2002/0060675 | A1 * | 5/2002 | Hashimoto | 345/204 |
| 2003/0133076 | A1 * | 7/2003 | Lehmeier et al. | 351/239 |
| 2003/0229857 | A1 * | 12/2003 | Sayuda et al. | 715/517 |
| 2004/0001613 | A1 | 1/2004 | Ohtsuka | |
| 2004/0190062 | A1 * | 9/2004 | McIntyre | 358/1.18 |
| 2005/0141941 | A1 * | 6/2005 | Narusawa et al. | 400/76 |
| 2005/0200860 | A1 | 9/2005 | Yamada | |
| 2006/0050297 | A1 | 3/2006 | Morikawa et al. | |
| 2006/0055962 | A1 | 3/2006 | Saito | |
| 2006/0149835 | A1 | 7/2006 | Odaira | |

FOREIGN PATENT DOCUMENTS

| | | |
|---|---|---|
| EP | 1377024 A2 | 1/2004 |
| JP | 2001-296980 | 10/2001 |
| JP | 2001-356895 | 12/2001 |
| JP | 2002-82968 | 3/2002 |
| JP | 2002-092168 | 3/2002 |
| JP | 2002-290661 | 4/2002 |
| JP | 2002-247258 | 8/2002 |
| JP | 2002-330252 | 11/2002 |
| JP | 2004-015308 A | 1/2004 |
| JP | 2004-73425 | 3/2004 |
| JP | 2005-117102 | 4/2005 |

(Continued)

OTHER PUBLICATIONS

European Patent Office Search Report dated Jul. 9, 2007, for European Patent Application No. EP 07251441.7-1522.

(Continued)

*Primary Examiner* — King Poon
*Assistant Examiner* — Allen H Nguyen
(74) *Attorney, Agent, or Firm* — Harness, Dickey & Pierce, P.L.C.

(57) ABSTRACT

An image processing device includes a processing part configured to process first image information so that second image information is generated; wherein the image information includes image data and reference information accompanying the image data; and the processing part correlates first reference information included in the first image information and second reference information included in the second image information, so that the first image information is processed and the second image information is generated.

14 Claims, 19 Drawing Sheets

FOREIGN PATENT DOCUMENTS

| | | |
|---|---|---|
| JP | 2005-176159 | 6/2005 |
| JP | 2005-189972 | 7/2005 |
| JP | 2006-42073 | 2/2006 |
| JP | 2006-79271 | 3/2006 |
| JP | 2006-81081 | 3/2006 |
| WO | WO 2005/094056 A1 | 10/2005 |

OTHER PUBLICATIONS

Office Action issued by the Japanese Patent Office on Aug. 9, 2011 for Application No. 2006-094902.

* cited by examiner

FIG.18

```
<?xml version="1.0" encoding="Shift-JIS"?>
<?xml-stylesheet type="text/xsl"
href="testxsl.xsl"?>

<document>
  <filename>sampleimage</filename>
  <username>Matsuda Taro</username>
  <date>2006/3/17.13:55:28</date>
  <pagenum>3</pagenum>
  <authority>group</authority>
  <image>sample.pdf</image>
</document>
```

IMAGE PROCESSING DEVICE, IMAGE PROCESSING METHOD, AND INFORMATION RECORDING MEDIUM

BACKGROUND OF THE INVENTION

1. Field of the Invention

The present invention generally relates to image processing devices, image processing methods, and information recording media.

2. Description of the Related Art

In a image processing device such as a copier, facsimile, printer and multiple function processing apparatus having functions of the copier, facsimile, and printer, there are devices or methods for easily adding data conversion functions for inputting or outputting an image correlating to a newly added device.

For example, Japanese Laid-Open Patent Application Publication No. 2001-356895 describes an image processing method wherein a single job is divided at units having different sizes such as a binder, document, page and band.

Because of this, a process for corresponding to a format of in put data and a format of output data is selectively executed by selecting the unit. When a process of a job correlating to data having new formats is formed, a process of a unit correlating to a range related to contents of the process may be formed.

In addition, for example, Japanese Laid-Open Patent Application Publication No. 2005-176159 describes a multiple function processing apparatus wherein a job is divided by a time axis, the order of a process being input is recognized as an operation of a document, and functional operation is realized by a module combining an input document, a user document and an output document. Thus, it is possible to easily make a module of a part common to the functional operation common in the time axis so that a software structure not influenced by adding or changing the function can be realized.

However, in the method described in Japanese Laid-Open Patent Application Publication No. 2001-356895, although the unit for dividing the job can be changed, when a process corresponding to a new format is added for adding a new function or making a new version of the function, it is necessary to form a process for converting plural other formats.

For example, in the multiple function processing apparatus having functions of the copier, facsimile, scanner, printer, or network interface, when the functions of the multiple function processing apparatus are added or a new version of the functions are made, a process corresponding to other functions of the multiple function processing apparatus should be formed.

However, as the number of the functions of the multiple function processing apparatus is increased, the number of processes to be newly formed is increased corresponding to the number of combinations. In the technique discussed in Japanese Laid-Open Patent Application Publication No. 2001-356895, while making the range of the subject to be processed small is considered, reducing the number of the subjects to be processed is not considered.

In the multiple function processing apparatus described in Japanese Laid-Open Patent Application Publication No. 2005-176159, the input document or the output document is divided into a common part and a different part and only the different part is changed in order to correspond to adding the functions. However, if the common part is changed due to the newly added document, it is necessary to change all the related documents. In addition, in a case where a delivery method of data from the input document to the user document or from the user document to the output document is changed due to adding the functions, it is necessary to change all of related documents. The technique described in Japanese Laid-Open Patent Application Publication No. 2005-176159 does not consider about the correspondence to these changed.

SUMMARY OF THE INVENTION

Accordingly, embodiments of the present invention may provide a novel and useful image processing device, image processing method, and information recording medium solving one or more of the problems discussed above.

More specifically, the embodiments of the present invention may provide an image processing device, image processing method, and information recording medium whereby even if data structures to be processed are changed or delivery of data is changed, it is possible to correspond to this.

One aspect of the present invention may be to provide an image processing device, including:

a processing part configured to process first image information so that second image information is generated;

wherein the image information includes image data and reference information accompanying the image data; and the processing part correlates first reference information included in the first image information and second reference information included in the second image information, so that the first image information is processed and the second image information is generated.

Another aspect of the present invention may be to provide an image processing method, including:

a processing step of processing first image information so that second image information is generated;

wherein the image information includes image data and reference information accompanying the image data; and first reference information included in the first image information and second reference information included in the second image information are correlated in the processing step, so that the first image information is processed and the second image information is generated.

Another aspect of the present invention may be to provide an information storage medium that can be read by a computer where an image processing program is stored, the image processing program configured to make the computer implement an image processing method, the image processing method including:

a processing step of processing first image information so that second image information is generated;

wherein the image information includes image data and reference information accompanying the image data; and first reference information included in the first image information and second reference information included in the second image information are correlated in the processing step, so that the first image information is processed and the second image information is generated.

According to the above-mentioned image processing device, image processing method, image processing program and information recording medium, whereby even if data structures to be processed are changed or delivery of data is changed, it is possible to correspond to this.

Other objects, features, and advantages of the present invention will be come more apparent from the following detailed description when read in conjunction with the accompanying drawings.

BRIEF DESCRIPTION OF THE DRAWINGS

FIG. 18 is a view showing an example of reference information; and

DETAILED DESCRIPTION OF THE PREFERRED EMBODIMENTS

A description is given below, with reference to the FIG. 1 through FIG. 19 of embodiments of the present invention.

First Embodiment of the Present Invention

While an example of an MFP is mainly discussed as an image processing device, the image processing device of the present invention is not limited to an MFP. The present invention can be applied to any image processing device as long as image data are sent or received between plural devices.
(Example of a System Having an Image Processing Device of the Embodiment of the Present Invention)

Figure 1:
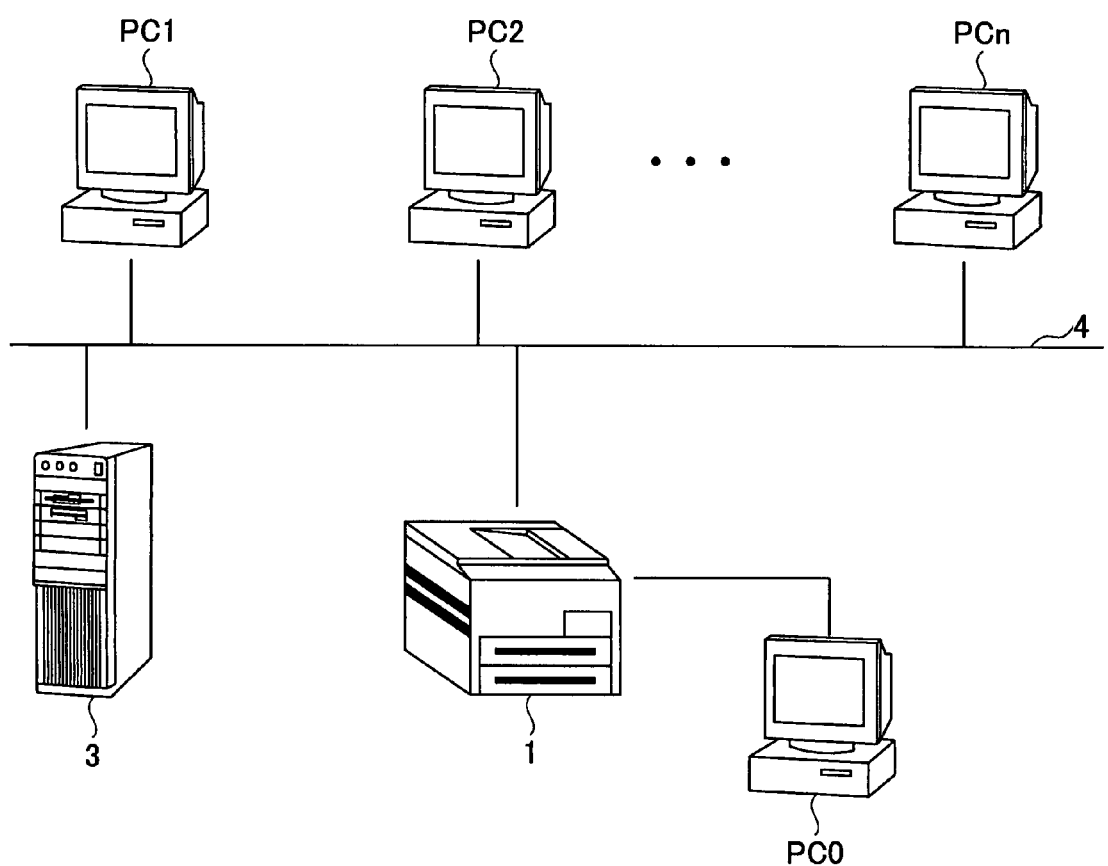
FIG. 1 is a view showing an example of a system including an image processing device of the embodiment of the present invention.

FIG. 1 is a view showing an example of the system including the image processing device of the embodiment of the present invention.

As shown in FIG. 1, a digital multiple function processing apparatus (hereinafter "MFP") 1 is connected to plural personal computers PC1 through PCn and a server 3 via a network 4. The MFP 1 is connected to a personal computer PC0 via a serial bus.

The MFP 1 has means for realizing a function of a copier, facsimile, printer, scanner, or network interface. In addition, the MFP 1 may have a ScanToEmail function for attaching an image of a manuscript read by the scanner and sending the image. The MFP1 may also have an input part for inputting an order of a process executed by the MFP 1 and a display part for displaying the status of the MFP 1.

The personal computers PC0 through PCn send and receive an order of a process executing each of the functions to the MFP 1 and data necessary for the process. The personal computers PC0 through PCn may output the status of the MFP 1 to the display part of the personal computer.

The server 3, based on request from the personal computers PC1 through PCn, sends and receives e-mail. The server 3 may manage the network 4 including the control of sending and receiving process requirements from the personal computers PC1 through PCn to the MFP 1.

The image processing device of the embodiment of the present invention is provided inside the MFP1. A device sending and receiving image data to and from the image processing device may be any of a device realizing each of the functions of the MFP 1, the personal computers PC0 through PCn, the server 3, or any device not shown in FIG. 1 and connected to the network 4.
(Example of Functional Structure of the Image Processing Device of the Embodiment of the Present Invention)

Figure 2:
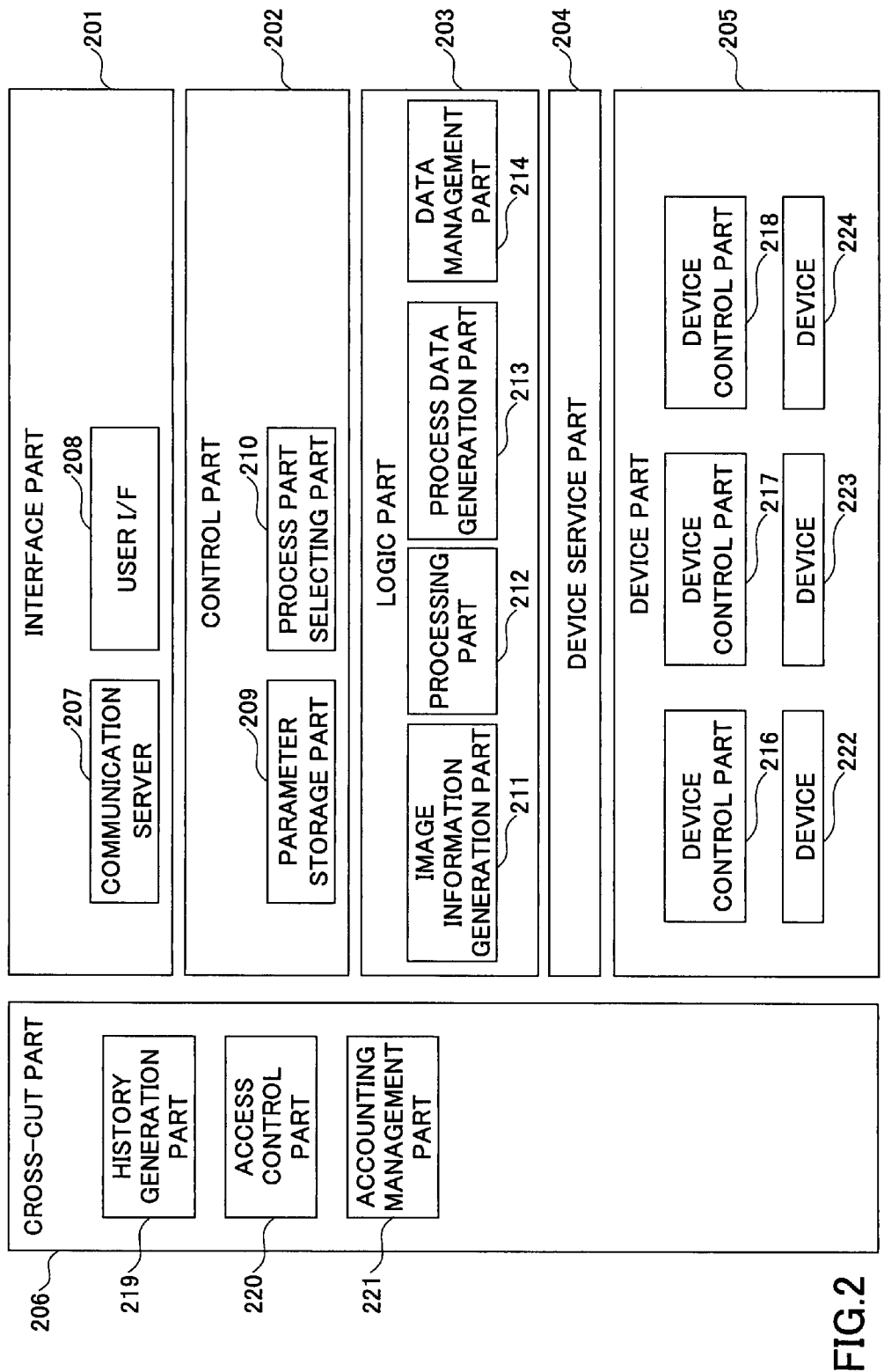
FIG. 2 is a block diagram showing a functional structure example of an MFP1.

FIG. 2 is a block diagram showing a functional structure example of the MFP1.

In FIG. 2, by processing the instruction being input to the MFP 1 inside, the device of the MFP 1 reads or forms the image. The MFP 1 includes an interface part 201, a control part 202, a logic part 203, a device service part 204, a device part 205, and a cross-cut part 206.

The interface part 201 inputs an order of a process from outside and outputs the status of a process of the image processing device to the outside. The interface part 201 includes a communication server 207 and a local user interface (hereinafter "local UI") 208.

The communication server 207 includes a communication part configured to send and receive a signal between the MFP1 and outside of the MFP 1 via the network or the serial bus.

The local UI 208 includes an input part configured to input execution of the process from the outside and a display part configured to control display of the status of the process of the MFP 1.

The control part 202, in order to execute the instruction of the process input to the interface part 201, selects each of the process parts of the logic part 203 and defines the order of execution of the selected process parts.

The control part 202 includes a parameter storage part 209 and a process part selecting part 210.

The parameter storage part 209 stores the instruction being input by the interface part 201 and a parameter used for the process implemented by the MFP 1. The process part selecting part 210, in order to execute the order being input from the interface part 201, selects the process part of the logic part 203 and determines the order of the execution.

In a state where plural processes are executed at the same time, the process part selecting part 210 may obtain the status of the process of the process part of the logic part 203 and determine the order of the execution based on the process status.

The process part selecting part 210 may determine the order of the execution under conditions such that the process time of plural processes is shortened or such as the priority order determined in advance for every function of the MFP 1. As a result of this, the resources of the MFP 1 can be efficiently used.

The logic part 203 realizes the contents of the process input by the interface part 201 based on the instruction input from the control part 202. The logic part 203 includes an image information generation part 211, a processing part 212, a process data generation part 213, and a data management part 214.

The logic part 201 may have a process part not shown in FIG. 2. In a case where a new function is added to the MFP 1 so that a part configured to execute a new process is added, a process part realizing the new function may be added to the logic part 203. As a result of this, a process part executing the same process can be commonly used by the above-mentioned process part of the MFP 1 and the process part newly added, so that the resources of the MFP 1 can be efficiently used and developing efficiency of the MFP 1 can be improved.

An image information generation part 211 generates image information related to an image processed by a device of the MFP 1. The image generation part 211 may generate image information by inputting data of the image processed by a device connected to the MFP 1 via the network or the serial bus from the interface part 201.

The processing part 212 processes the image information generated by the image information generation part 211 in order to correspond to the device and generates the image information processed by a process data generation part 213. The process data generation part 213 generates, based on the image information generated by the processing part 212, the image data corresponding to the device, (Example of a Data Structure of the Image Information)

Figure 3:
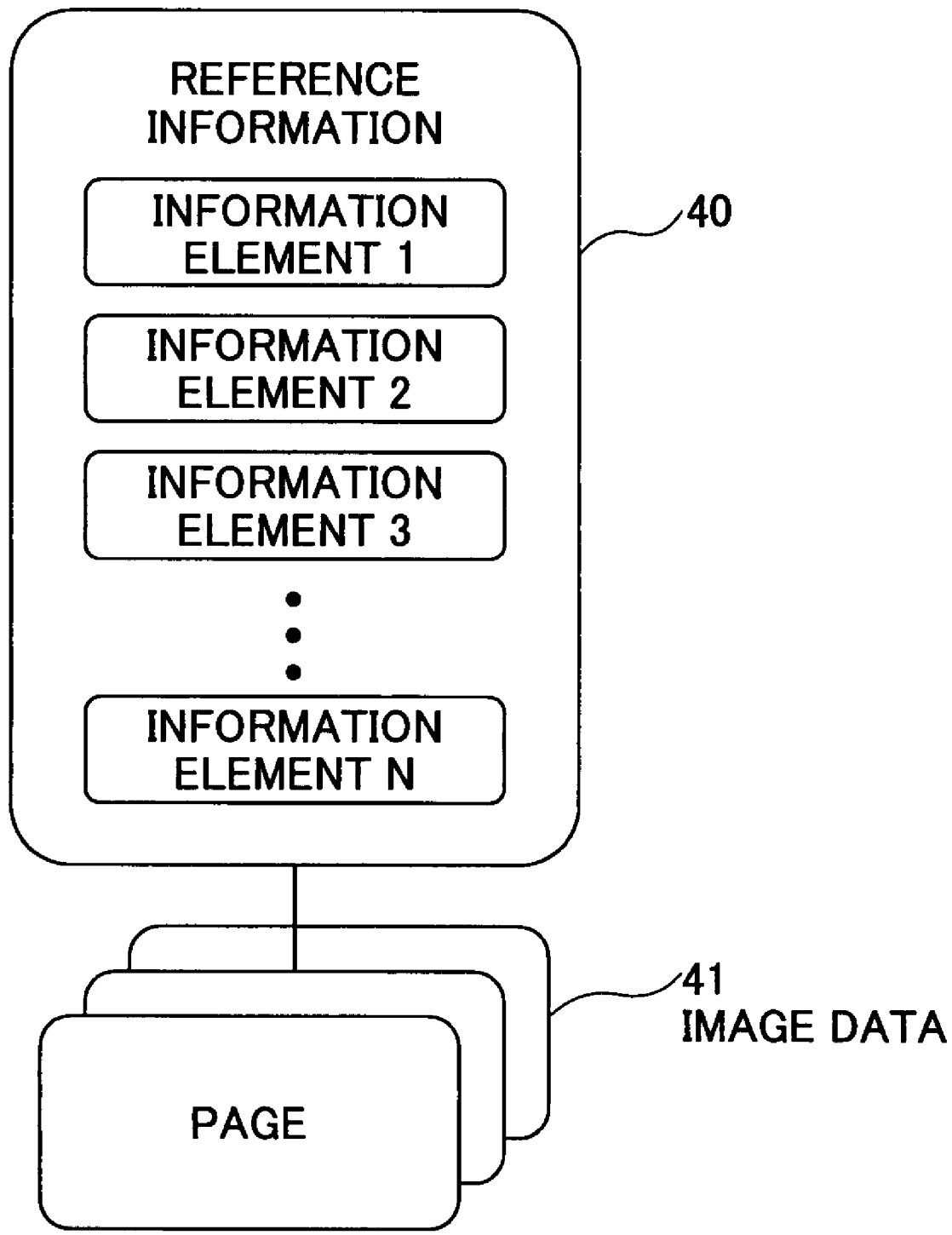
FIG. 3 is a view showing an example of a data structure of image information.

FIG. 3 is a view showing an example of a data structure of the image information.

The image information shown in FIG. 3 includes image data 41 as data of the image and reference information accompanying the image data.

The image data 41 are data of the image itself and include the size of the image and color information indicating whether the data are color or monochrome. For example, the image data 41 are bit map type or JPEG type. The image data 41 may be in any format that can be processed by the MFP 1.

By unifying the format of the image data 41 in the image information held or processed by the MFP 1, it is possible to make the process have a high speed or easy and make the processing part 212 in the logic part 203 common. The image data 41 may further have page data of a page unit or image data of another unit.

The reference information 40 includes information element 1 through information element N corresponding to the image data. The image element contains information not directly used for forming the image such as a person making the image, the title of the image, or the size of the image data in the information related to the image.

The order of the information elements 1 through N of the reference information 40 is not decided simply. A property of each of the information elements is determined by describing the reference information 40 with a data description language such as XML. Because of this, even if the structure of the reference information is different in the image information corresponding to the device, an algorithm of the plural conversion processes can be made common by using the image information having the structure shown in FIG. 3 and corresponding to the information element having the same property.

(Processing Process, Output Process)

Referring back to FIG. 2, when the image information generation part 211 generates the image information having the structure shown in FIG. 3, the data of the image processed by the device are the image data 41 shown in FIG. 3. The image data 41 and the reference information 40 generated based on other data input from the device, the data input from the local UI 208, or the parameter of the MFP 1 are correlated to each other.

The processing part 212 generates second image information by selecting the information element having the same property as that of the information element of the reference information of the image information generated by the processing data generation part 213 from the information element of the reference information 40 of first image information generated by the image information generation part 211. The process data generation part 213 generates data having a format processed by the device from the second image information generated by the processing part 212.

(Device Service Part and Device Part)

The device service part 204 gives the order from the logic part 203 to each of the device control parts of the device part 205 and gives the signals indicating the status of the device from each of the device control parts of the device part 205 to each of the processing parts of the logic part 203. Thus, each of the processing part of the logic part 203 may output the order to the device part 205 to only the device service part 204 so that the structure of each of the processing parts can be made simple. Furthermore, the device control parts may output the signals to the logic part 203 to only the device service part 204.

The device part 205 controls each of the devices of the MFP 1. The device part 205 includes devices 222 through 224 and corresponding device control parts 216 through 218.

(Cross-Cut Part)

The cross cut part 206 realizes functions used in common in the interface part 201 through the device part 205 and includes a history generation part 219, an access control part 220 and an accounting management part 221.

The history generation part 219 forms processed contents of parts set in advance among parts of the MFP 1 such as the interface part 201 to the device part 205 and devices not shown in FIG. 2.

The access control part 220 determines the possibility of execution of the process executed by the MFP 1 based on authority information and identification of the operator. As a result of this, it is possible to implement any limitation corresponding to the operator of the MFP 1 or the access way so that illegal access to the MFP 1 can be eliminated. In addition, the accounting management part 221 manages fees to be charged based on the use status of the MFP 1.

(Process of the Image Information)

Figure 4:
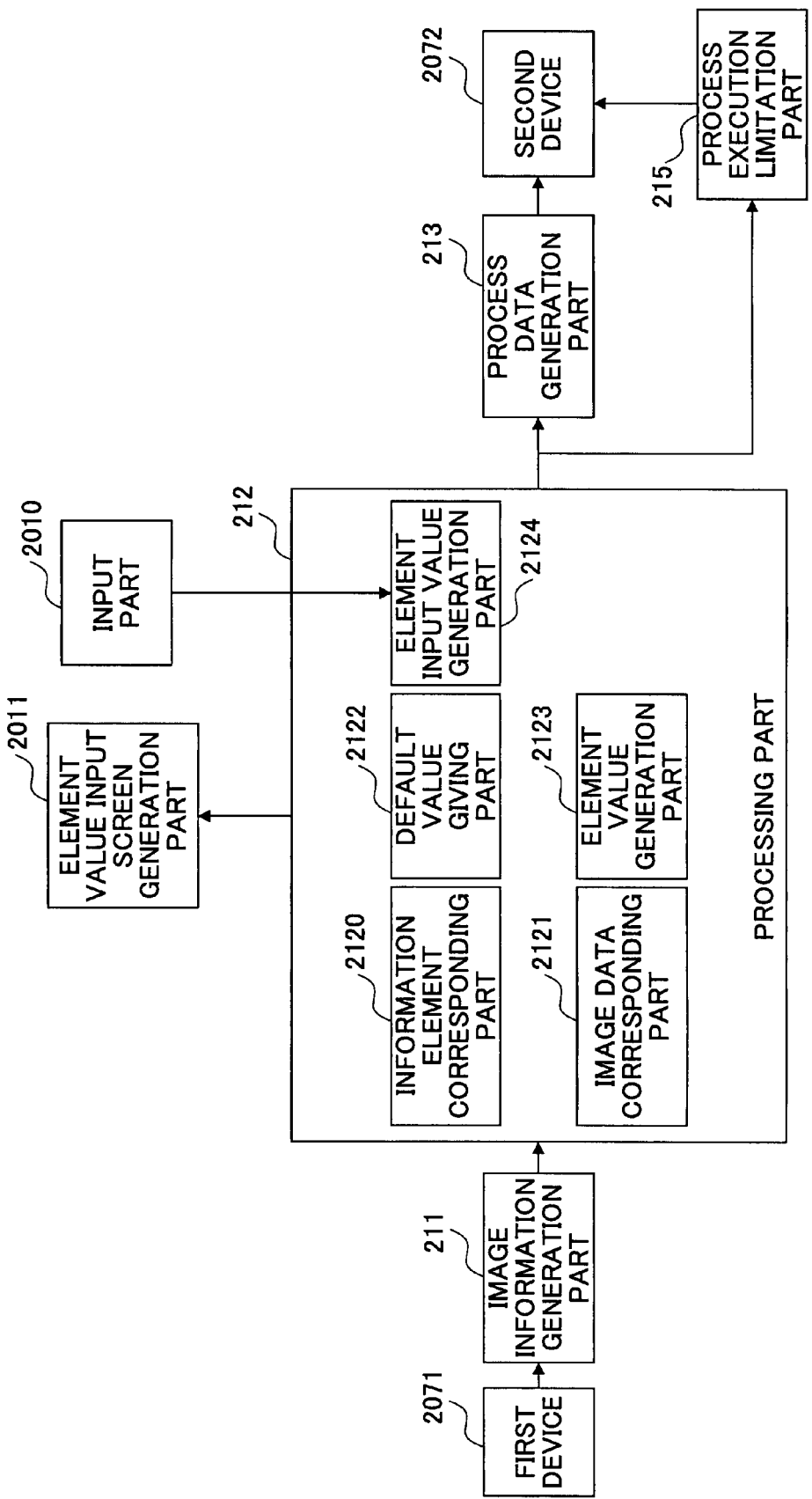
FIG. 4 is a block diagram showing a process in the functional structure example of the MFP1.

FIG. 4 is a block diagram showing a process in the functional structure example of the MFP1.

In FIG. 4, the image data processed by a first device 2071 are converted to data processed by a second device 2072 via a form of the image information.

The MFP 1 includes the processing part 212, the image information generation part 211, the process data generation part 213, the process execution generation part 215, an input part 2010, an element value input screen generation part 2011, the first device 2071 and the second device 2072.

The processing part 212 is provided in the logic part 203. The processing part 212 generates second image information corresponding to the second device 2072 from the first image information of the image processed by the first device 2071. The processing part 212 includes an information element corresponding part 2120, an image data corresponding part 2121, a default value giving part 2122, an element value generation part 2123, and an element input value generation part 2124.

The information element corresponding part 2120 correlates to the second information element included in the reference information of the second image information by selecting the information element having the same property from the first information element included in the reference information of the first image information. The image data corresponding part 2121 corresponds to the image data of the first image information as the image data included in the second image information.

In a case where all of the information elements corresponding to the second information element are included in the reference information of the first image information, the second image information is generated by the information element corresponding part 2120 and the image data corresponding part 2121.

On the other hand, in a case where the corresponding information of the second information element is not included in the reference information of the first image information, the value of the second information element is determined by the method discussed below.

A default value giving part 2122 reads a designated default value set in advance for every property of the information element and stored in the parameter storage part 209. The default value giving part 2122 makes the default value be a value corresponding to the property of the second image information.

An element value generation part 2123 generates a value corresponding to the property of the second image information from a value of the status of the MFP 1. The value of the status of the MFP 1 is, for example, date and time of processing the image or name or ID of the operator of the MFP 1.

An element input value generation part 2124 makes the value input from the input part 2010 have the value of the property of the second information element.

An element value input screen generation part 2011 generates a screen encouraging input of the value of the property of the second information element.

The image information generation part 211 and the process data generation part 213 are provided in the logic part 203.

The image information generation part 211 generates the image information of the image processed by the first device 2071. The process data generation part 213 generates the data processed by the second device 2072 from the second image information generated by the processing part 212.

In a case where, in the processing part 212, the second image information is not generated, the value of the designated information element in the second image information is not obtained, or the value of the designated information element in the second image information is not proper, the process execution limitation part 215 outputs a signal limiting the execution of the process of the second device 2072.

As a result of this, it is possible to prevent improper access to the MFP 1 and prevent improper operation of the MFP 1. The process execution limitation part 215 may be provided as a processing part of the logic part 203.

The process execution limitation part 215 may be provided inside the process part 212, process data generation part 213, or the image information generation part 211. Because of this, in a case where the value of the information element necessary for executing the function of the device has not been obtained, the operation of the device of the MFP 1 is limited and the improper operation of the MFP 1 is prevented.

The second device 2072 processes the process data generated by the process data generation part 213 based on the second image information so that the image is formed.

(Copying Process)

Figure 5:
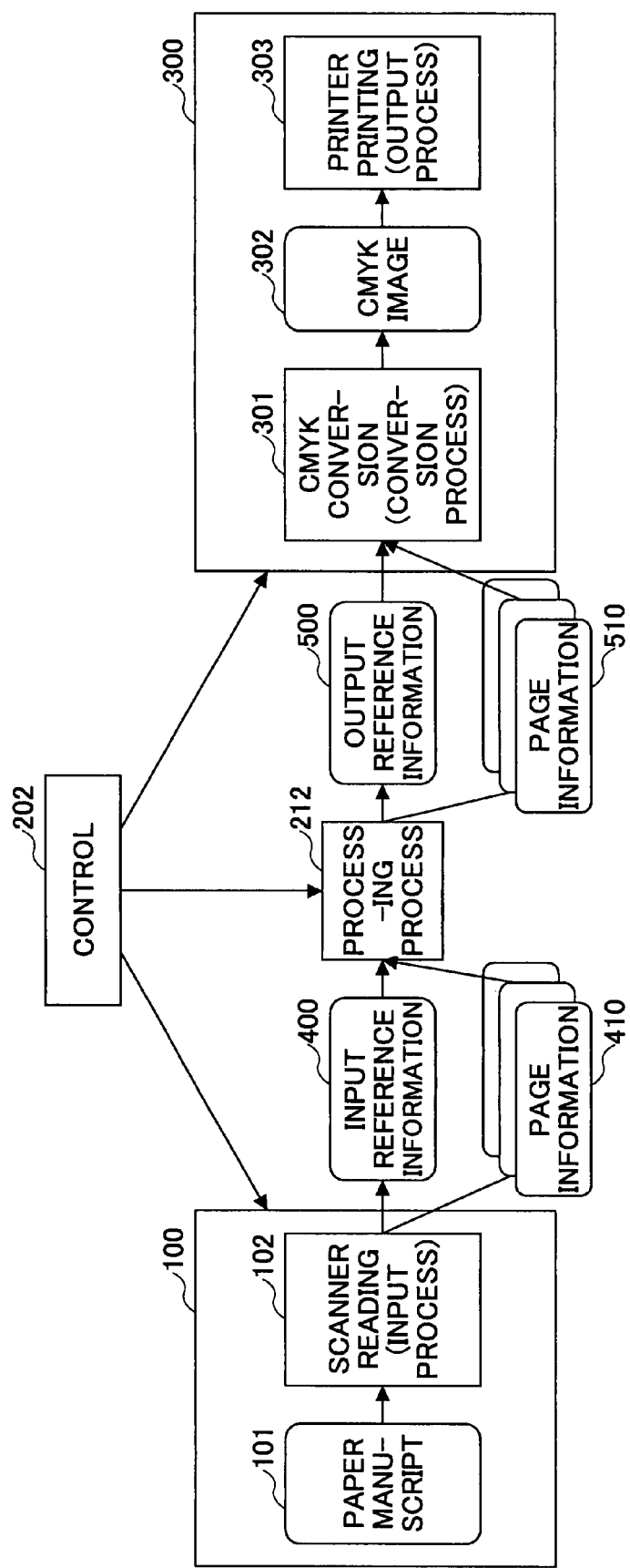
FIG. 5 is a block diagram showing a copying process of the MFP1.
Figure 6:
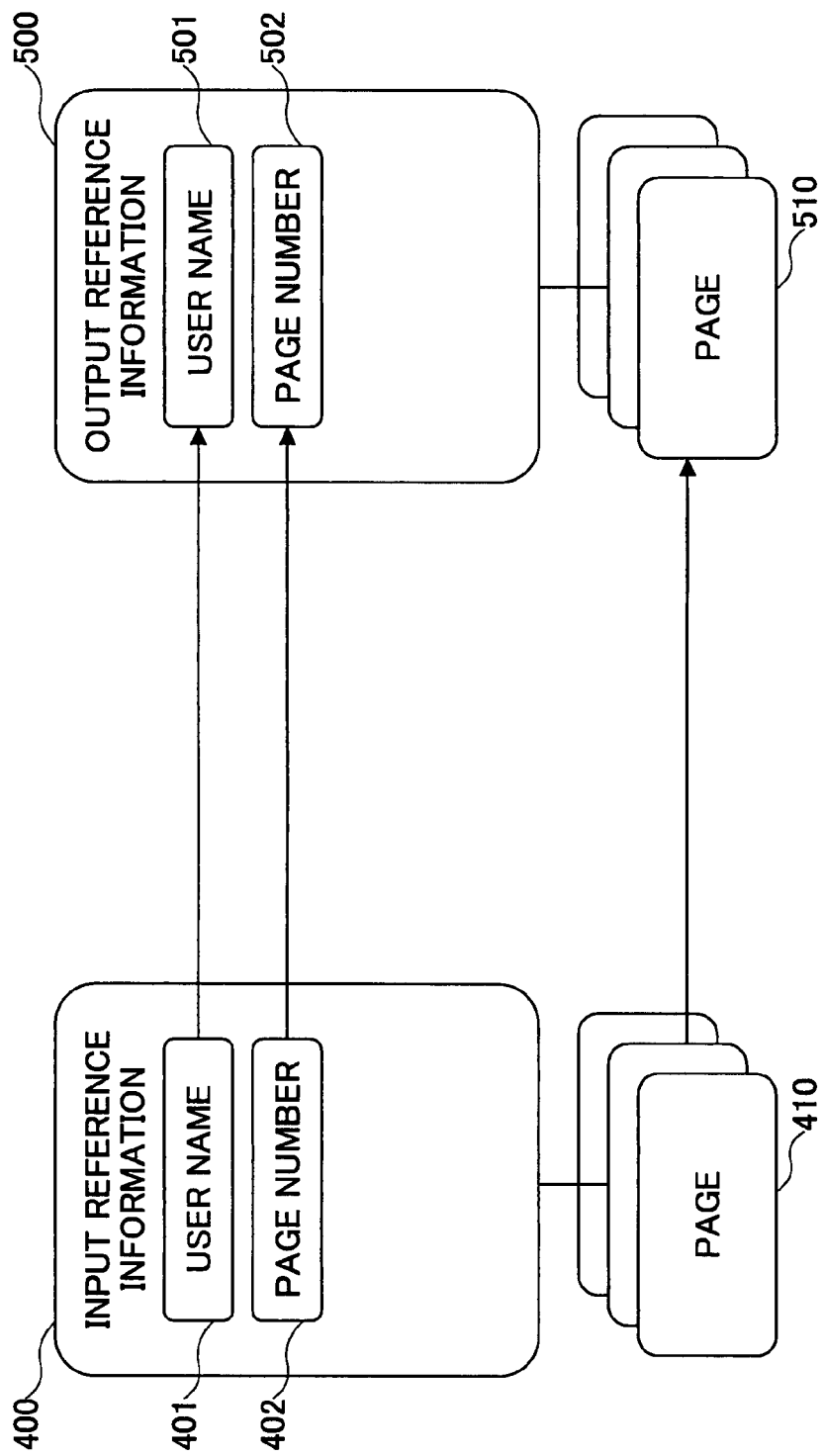
FIG. 6 is a view showing details of image information in the copying process.

FIG. 5 is a block diagram showing the copying process of the MFP1. FIG. 6 is a view showing details of image information in the copying process.

The image is read by the scanner of the MFP 1 and output from the printer. Referring to FIG. 5, the process part 100 at the input side reads a paper manuscript 101 and generates page information that is image data by the scanner 102.

The page information is generated as image data of a RGB format whenever a single paper is read by the scanner 102. The page information may be converted to a data format such as JPEG. The page information is generated and input reference information 400 is generated by the image information generation part 211, so that the image information is generated by correlating the input reference information 400 to the page information 410.

The information element corresponding part 2120 of the processing part 212 takes out the information element used in the process part 300 at the output side from the input reference information 400 and correlates it so that output reference information 500 is generated. The image data corresponding part 2121 correlates page information 410 to page information 510.

In a CMYK conversion part 301 of the processing part 300 at the output side, the process data generation part 213 generates the CMYK image 302 as image data corresponding to printer output from the output reference information 500 and the page information 510. The generated CMYK image 302 is processed by the printer control part of the device part 205 and the printer 303 outputs an image formed on the paper.

The control part 202 controls each of the processes of the process part 100 at the input side, the processing part 212, and the process part 300 at the output side.

FIG. 6 is a view showing details of the image information in the copying process. The image information read by the scanner 102 includes the input reference information 400 and the page information 410 as the image data.

The input reference information 400 includes the user name 401 and the page number 402 as the information elements. The user name is, for example, a name or an ID of the operator of the MFP 1. In the process part 100 at the input side, the information obtained as the information element is not limited to the user name and the page number but may be different depending on the structure of the process part 100 at the input side.

The image information related to the image output by the printer 303 includes the output reference information 500 and page information 510 as the image data. The image output by the printer 303 requires the user name and the page number. Hence, the information element of the output reference information is the user name 501. The information element of the output reference information is not limited to the user name and the page number but may be different depending on the structure of the process part 300 at the output side.

The information element corresponding part 2120 correlates the user name 401 to the user name 501 and correlates the page number 402 to the page number 502 so that the output reference information 500 is generated.

(Network Printer)

Figure 7:
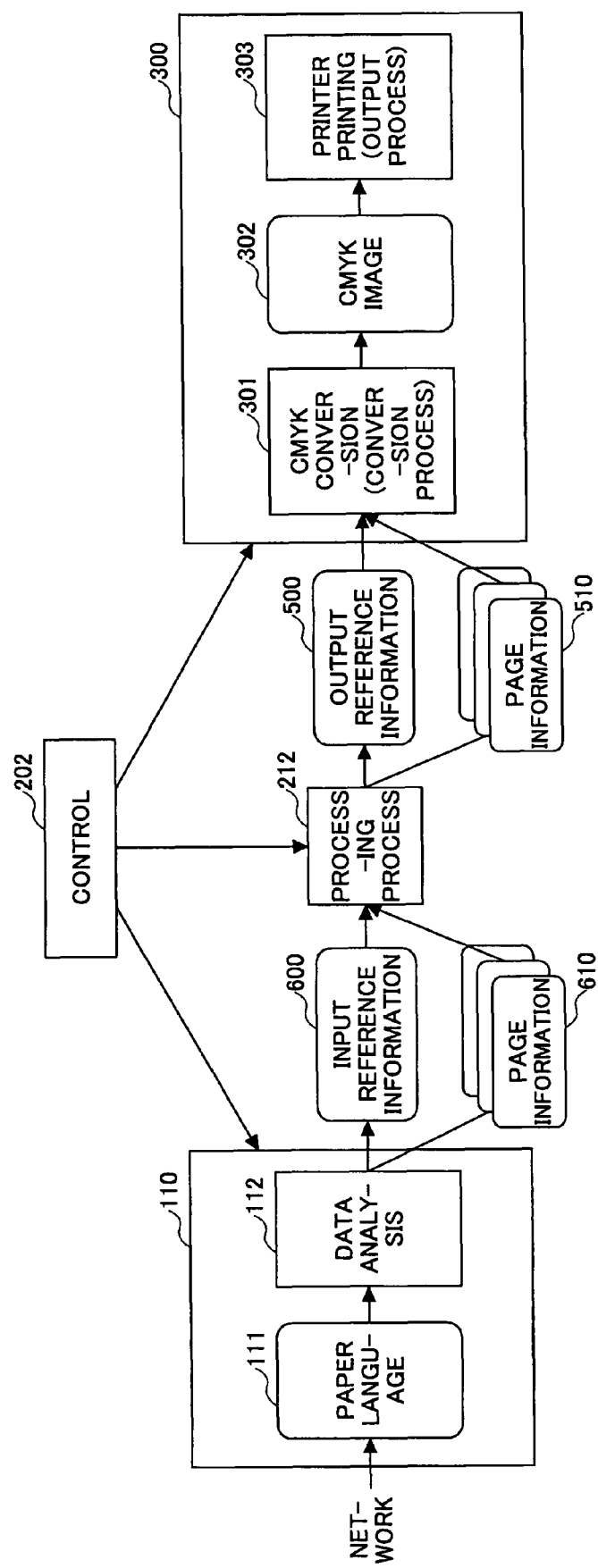
FIG. 7 is a block diagram showing an example showing a network printer process in the MFP1.

FIG. 7 shows image information generated in a case where the MFP 1 works as the network printer. In the example shown in FIG. 7, by inputting the image data from the network interface of the MFP 1 and processing the image data, the image is output from the printer. In the processing part 110 at the input side, data 111 having a format of a printer language are input from a network via a communication server part 207.

The data analysis part 112 analyzes the printer language and generates the page information 610 as the image data, and the image information generation part 211 generates the input reference information 600.

The information element corresponding part 2120 of the processing part 212 takes out the information element used in the processing part 300 at the output side from the input reference information 600 so as to generate the output reference information 500. The image data corresponding part 2121 correlates the page information 610 to the page information 510.

Since the processing part 300 at the output side and the control part 202 implement the same process as shown in FIG. 5, the explanation thereof is omitted.

Figure 8:
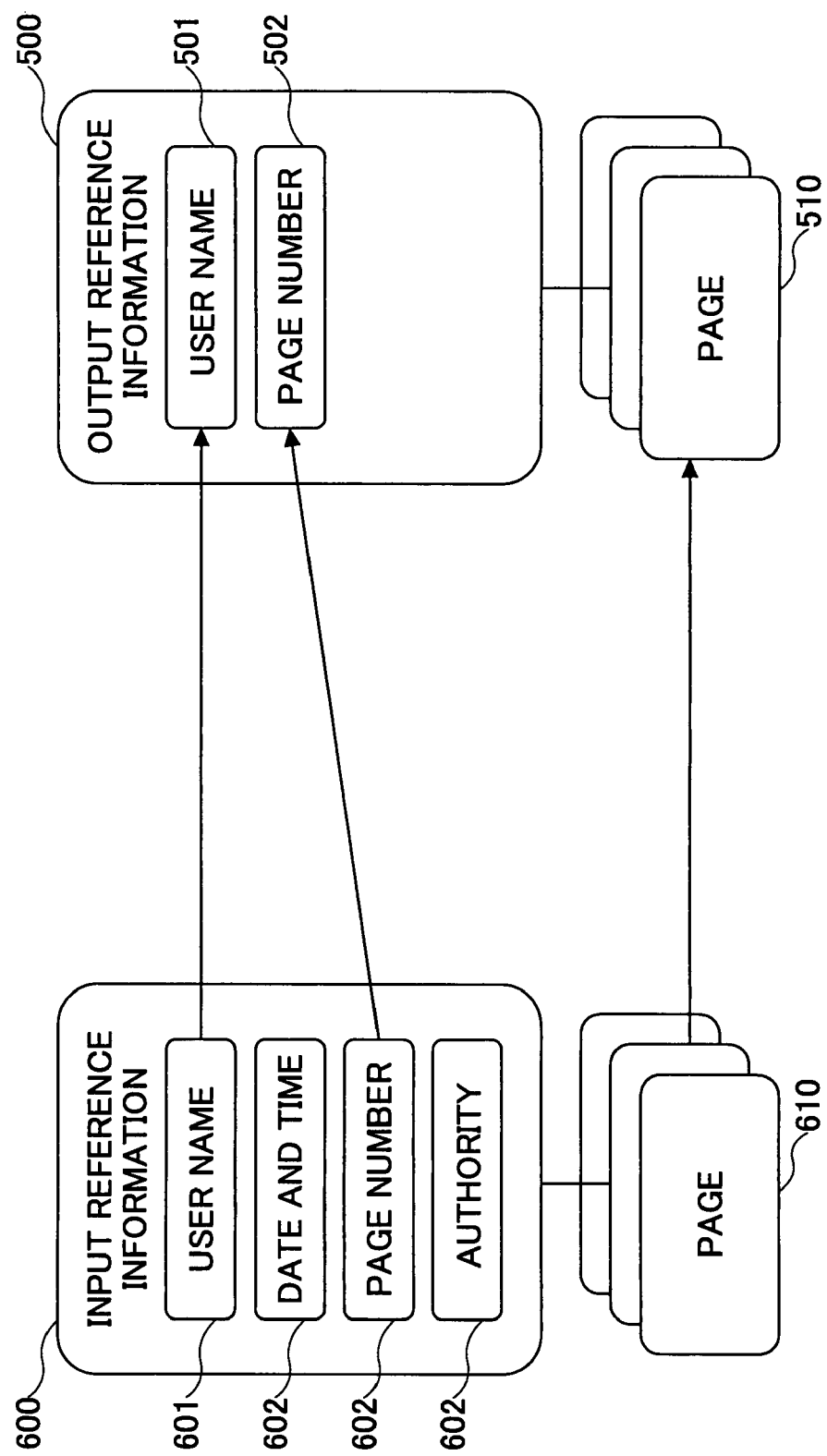
FIG. 8 is a view showing details of image information in the network printer process.

FIG. 8 is a view showing details of the image information in the network printer process. The data of the image including the printer language input via the network is converted to the image information so that the input reference information 600 and the page information 610 as the image data are generated.

The input reference information 600 includes a user name 601, a day and time 602, a page number 603, and authority 604. The user name 601 is an ID of the user requesting the MFP 1 to implement the process via the network. The day and time 602 is a day and time when the input image data are generated and edited. The authority 604 indicates the access authority to the input data. The information element obtained by the processing part 110 at the input side is not limited to the example shown in FIG. 8 but may differ depending on the structure of the processing part 110 at the input side or the contents of the process.

Since the output reference information 500 and the page information 510 have the same structures as those shown in FIG. 6, the explanation thereof is omitted.

The information element corresponding part 2120 of the processing part 212 correlates, the page number 603 to the page number 502 so that the output reference information 500 is generated.

As shown in FIG. 5 through FIG. 8, even if the process at the input side is changed from input from the scanner to the input of the printer language via the network, the contents processed by the processing part 300 at the output side are not changed. Hence, it is possible to easily add new functions in the MFP 1 as the image processing device of the embodiment of the present invention.

In addition, the arranging number of the information elements of the reference information is not required to be unified (fixed) in the MFP 1. The processing part 212 may take out the necessary information element by searching inside the reference information.

(Scanner Process)

Figure 9:
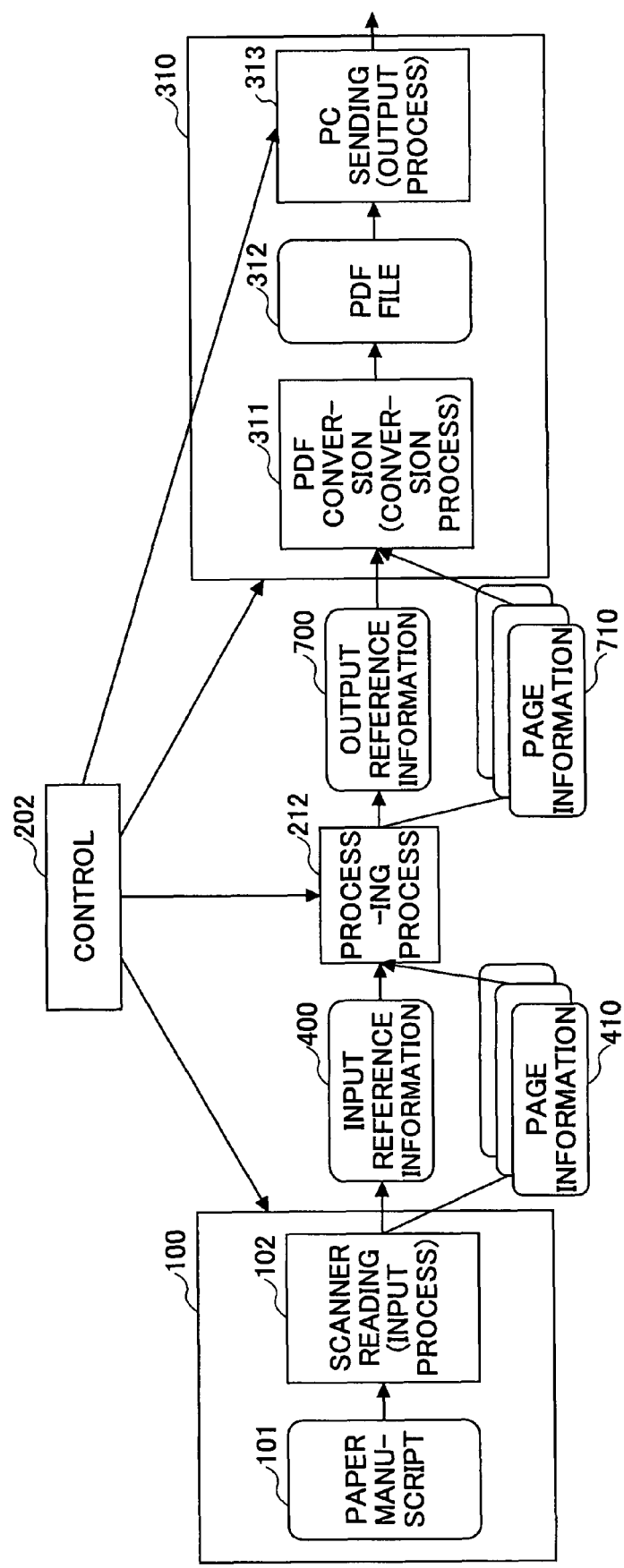
FIG. 9 is a block diagram showing a scanner process in the MFP1.
Figure 10:
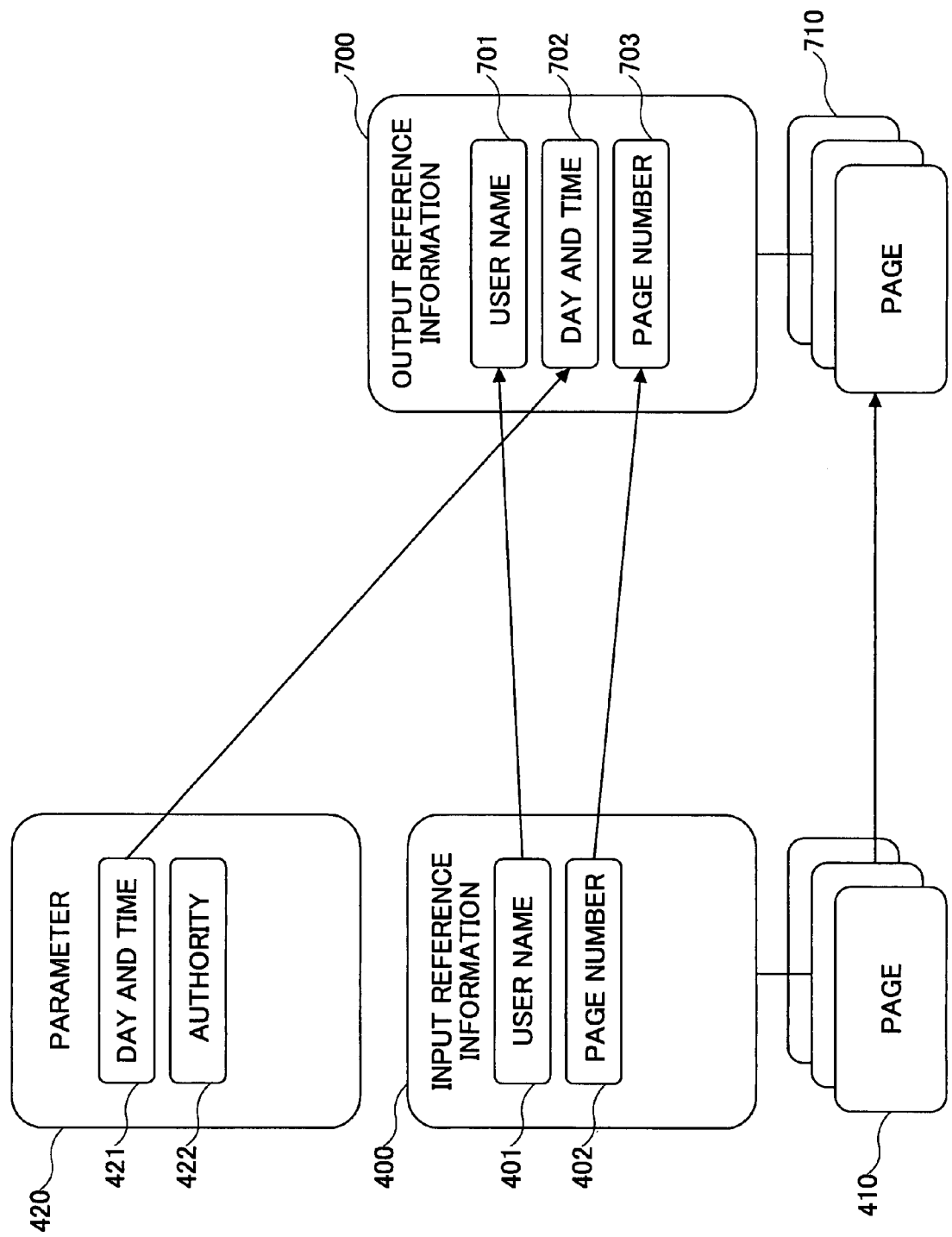
FIG. 10 is a view showing details of image information in the scanner process.
Figure 11:
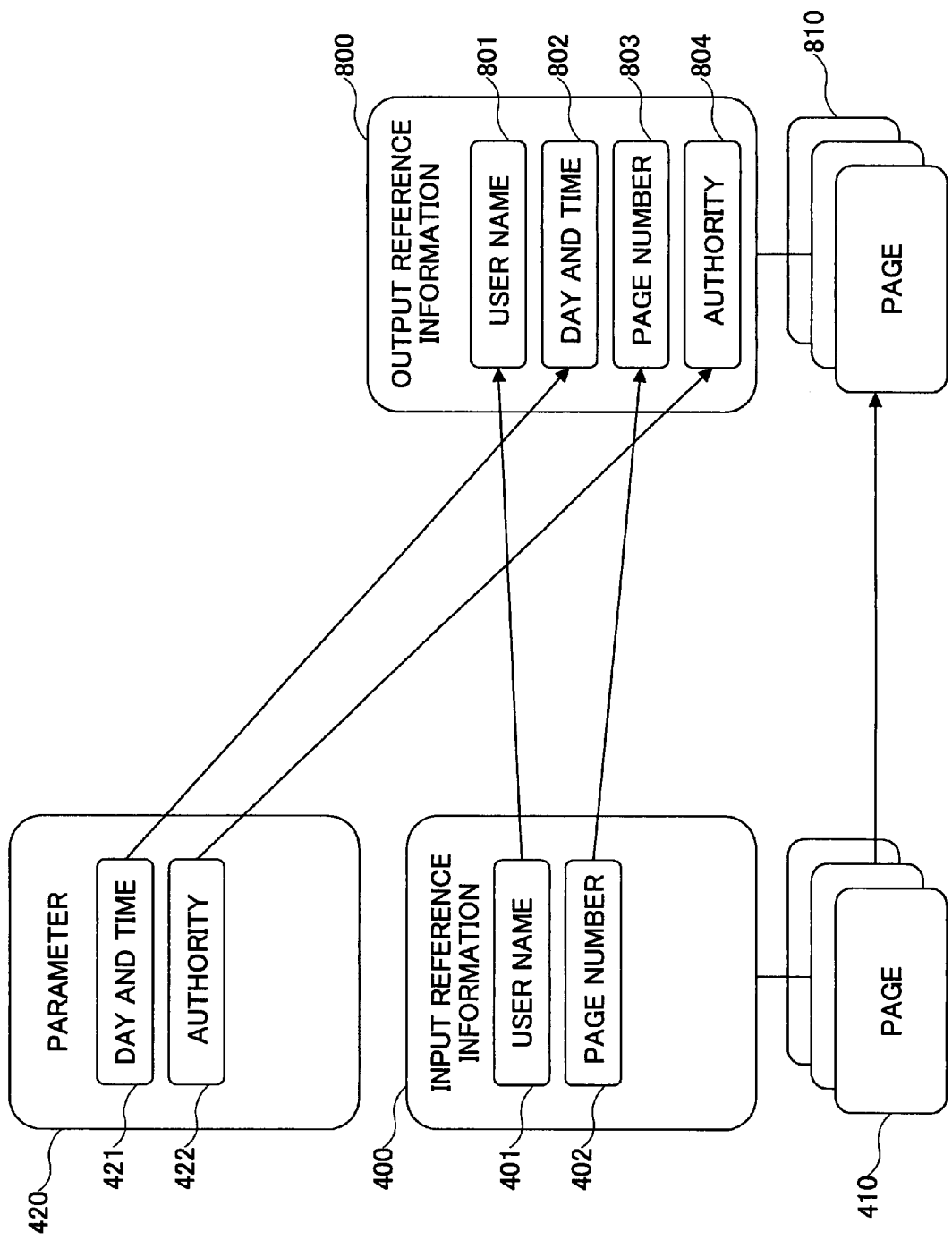
FIG. 11 is a view showing an example different from that shown in FIG. 10 of the image information in the scanner process.

FIG. 9 is a block diagram showing the scanner process in the MFP1. FIG. 10 is a view showing details of the image information in the scanner process. FIG. 11 is a view showing an example different from that shown in FIG. 10 of the image information in the scanner process.

In the example shown in FIG. 9, the PDF file generated based on the image being read from the scanner of the MFP 1 is sent to the PC. Since the contents of the process and the structure of the control part 202, the processing part 100 at the process side, the input reference information 400 and the page information 410 are the same as those of FIG. 5, the explanation thereof is omitted.

The information element corresponding part 2120 of the processing part 212 takes the information element necessary for generating the PDF file from the information element of the reference information 400 so as to correspond to each other and generates the output reference information 700. The image data corresponding part 2121 correlates the page information 410 to the page information 710. In a case where the information element necessary for generating the PDF file is not included in the input reference information 400, the information element is obtained by a designated method.

In the PDF conversion part 311 of the processing part 310 at the output side, the process data generation part 213 generates the PDF file 312 from the output reference information 700 and the page information 710. The generated PDF file 312 is sent to a PC, via the communication server 207, connected to the MFP 1 directly or via the network. The PDF file 312 may be stored in a storage part of the MFP 1.

As mentioned above, FIG. 10 is a view showing details of the image information in the scanner process. The image information related to the image read by the scanner 102 includes the input reference information 400 and the page information 410 as the image data. The input reference information 400 includes the user name 401 and the page number 402 as the information elements. The user name 401 is the name or ID of the operator of the MFP 1. The parameter 420 stored in the parameter storage part 209 includes the day and time 421 and the value of the authority 422.

On the other hand, the image information necessary for generating the PDF file 312 includes the output reference information 700 and the page information as the image data.

The output reference information 700 includes, as the information elements, a user name 701, a day and time 702, and the page number 703. The information element of the output reference information is not limited to the user name and the page number but may be different depending on the structure of the process part 310 at the output side including the PDF file 312 and the contents of the process.

The information element corresponding part 2120 of the process part 212 correlates the user name 401 to the user name 701 and the image data corresponding part 212 correlates the page number 402 to the page number 703. However, the day and time 702 when the PDF file is formed is not included in the input reference information 400. Because of this, the element value generation part 2123 of the process part 212 obtains the day and time 702 when the PDF file 312 is formed from the parameter 420 and generates the day and time 702 as the information element.

The day and time 421 when the file is formed and the value of authority 422 indicating the access authority of the formed file are included in the parameter 420 stored in the parameter storage part 209. The value included in the parameter 420 may be obtained from the status of the functions of the MFP 1. For example, in a case where the day and time 421 are obtained, the day and time when the file of the image is formed may be obtained by a clock function of the MFP 1. The parameter 420 may include the value indicating the access limitation to the formed PDF file obtained from the history holding part 219, the access limitation part 220, or the like.

(Another Explanation of Scanner Process)

FIG. 11, as well as FIG. 10, is a view showing image information in a case where image information necessary for forming the PDF file 312 forms the image information related to the image read by the scanner 102. Output reference information that is different from that shown in FIG. 10 is shown in FIG. 11.

In the example shown in FIG. 11, output reference information 800 is generated from the input reference information 400 and the parameter 420 stored in the parameter storage part 209. The values included in the parameter, the input reference information 400, and the page information 410 are the same as those shown in FIG. 10 and therefore explanation thereof is omitted.

In the example shown in FIG. 11, the output reference information 800 includes, as information elements, the user name 801, the day and time 802, the page number 803, and the authority 804 and corresponds to the page information 810.

Comparing the output reference information 800 and the output reference information 700 shown in FIG. 10, the authority 804 as the information element is added to the output reference information 800. The information element corresponding to the authority 804 can be obtained from the authority 422 included in not the input reference information 400 but the parameter storage part 420.

The information element corresponding part 2120 of the process part 212, by the same process as that shown in FIG. 10, obtains the values of the page number 803, the user name 801, and the day and time 802. The element value generation part 2123 correlates the authority 422 to the authority 804 so as to generate the output reference information. The image data corresponding part 2121 correlates the page information 410 to the page information 810 so as to generate the image information.

In the examples shown in FIG. 10 and FIG. 11, while the processes implemented by the process part 212 and the process data generation part 213 are different, the processes implemented by the image information generation part 211 are the same. For example, even if the structure of the PDF file 312 of the process part 310 at the output side is changed, there is no need to change the structure or the contents of the process implemented by the process part 100 at the input side. The reference information of the image information may be changed from the output reference information 700 to the output reference information 800. Therefore, even if the data structure is changed, it is possible to easily correspond by changing the process part 100 at the input side or the process part 310 at the outside part of the data structure to be changed.
(Correspondence by Default Value)

Figure 12:
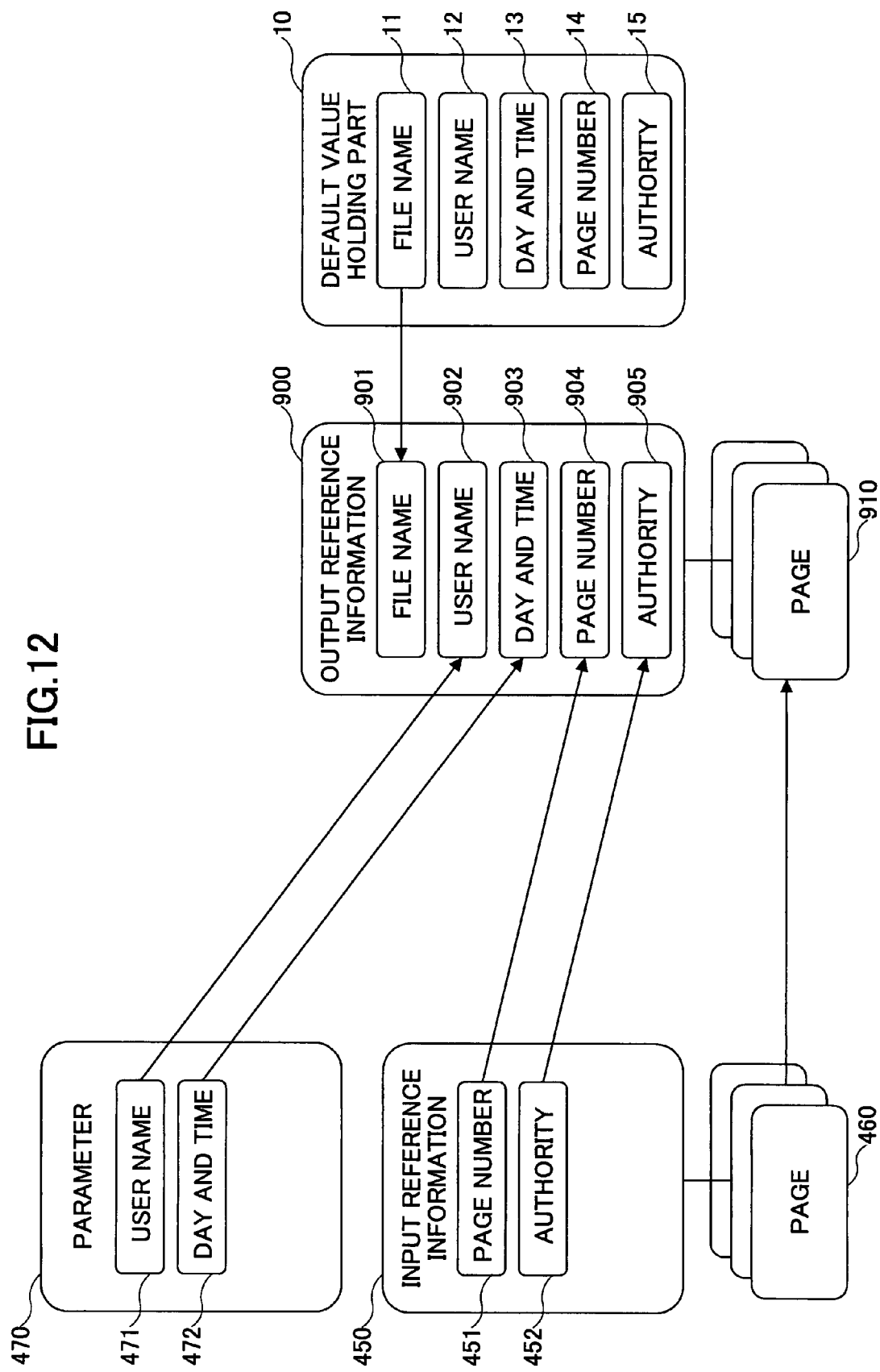
FIG. 12 is a first view showing an example of image information processed at a processing part at an output side.
Figure 13:
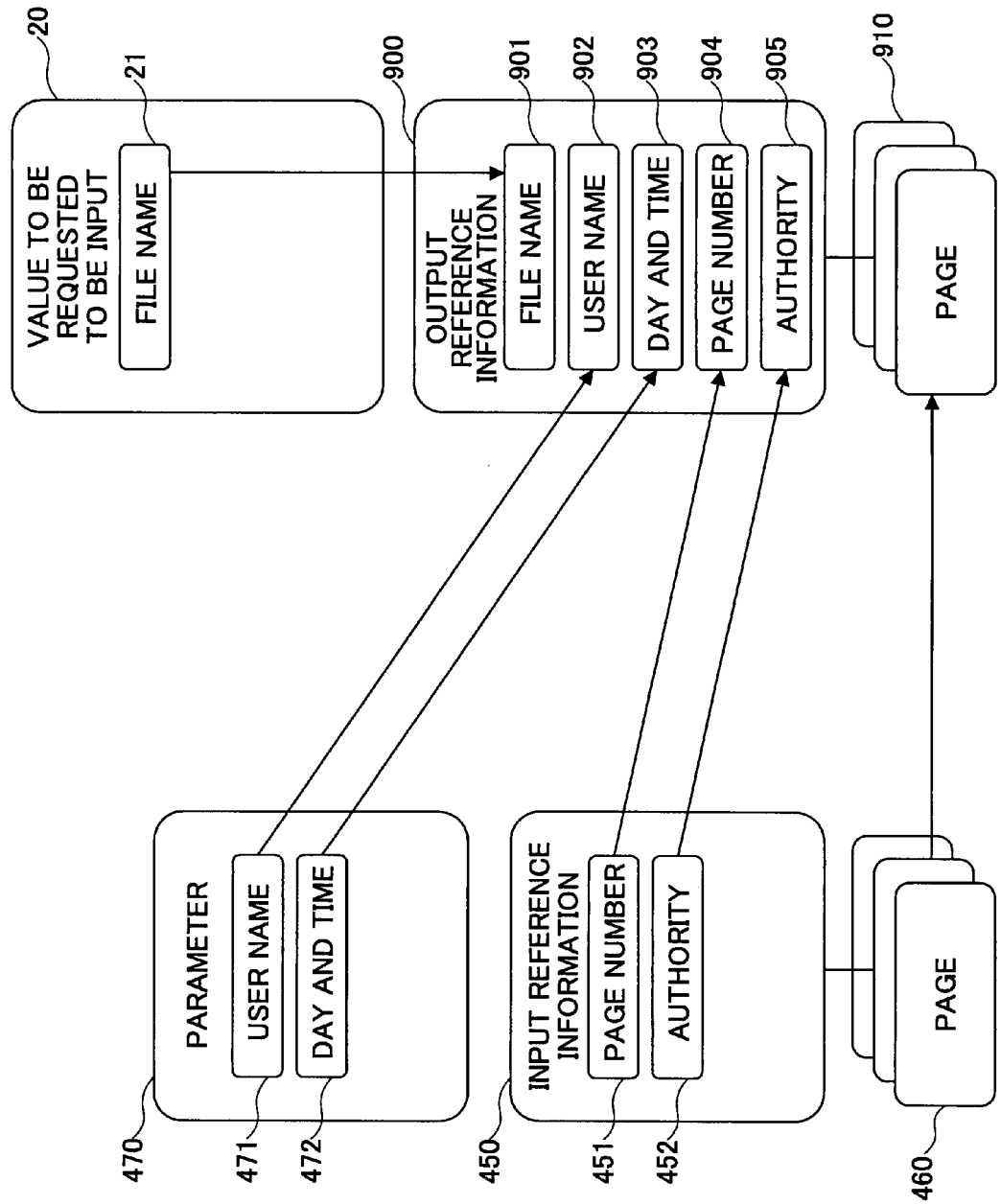
FIG. 13 is a second view showing the example of the image information processed at the processing part at the output side.

FIG. 12 is a first view showing an example of image information processed at a processing part at the output side. FIG. 13 is a second view showing the example of the image information processed at the processing part at the output side. In the example shown in FIG. 12 and FIG. 13, image information different from the example shown in FIG. 10 and FIG. 11 is generated.

In the example shown in FIG. 12, image information having the output reference information 900 and the page information 910 is generated from the input reference information 450. The input reference information 450 includes the page number 451 and the authority 452 as information elements and is included in the image information together with the page information 460. The user name 471 and the day and time 472 are included in a parameter 470 stored in the parameter storage part 209.

On the other hand, the output reference information 900 includes, as information elements, the file name 901, the user name 902, day and time 903, the page number 904 and the authority 905.

The information element corresponding part 2120 of the process part 212 correlates the page number 451 to the page number 904 from the information element of the input reference information 450 and correlates the authority 452 to the authority 905.

In addition, the element value generation part 2123 correlates the day and time 472 to the day and time 903 and correlates the user name 471 to the user name 902 from the parameter 470 stored by the parameter storage part 209.

However, the information element corresponding to the file name 901 is not stored in either the input reference information 450 or the parameter storage part 209. Accordingly, the default value giving part 2122 of the process part 212 refers to the default value set in advance from the storage part of the MFP 1. The value set in advance is stored in the default value holding part 10. The default value holding part 10 may be stored in the parameter storage part 209.

The default values of the file name 11, the user name 12, the day and time 13, the page number 14, and the authority 15 are held in the default value holding part 10. The default value may be not only the designated value but also a method for obtaining a value by a designated process. For example, the day and time 13 may be a designated day and time. Furthermore, for example, the default value of the day and time 13 may be obtained by reading the stored instruction such as "referring to the day and time when the MFP 1 processes" by the default value giving part 2122 and implementing the designated process.

The process part 212 correlates the file name 11 held by the default value holding part 10 to the file name 901 by the default value giving part 2122, correlates to other information elements, and correlates the page information 460 to the page information 910 so that the image information is generated.
(Correspondence by the Value being Input)

In the example shown in FIG. 13 as well as FIG. 12, the image information having the output reference information 900 and the page information 910 is formed from the input reference information 450 and others.

Since the structures of the input reference information 450, the page information 460, the parameter 470 stored in the parameter storage part 209, and the page information 910 are the same as those shown in FIG. 12, the explanation thereof is omitted.

The output reference information 900, shown in FIG. 13 as well as FIG. 12, includes the file name 901, the user name 902, the day and time 903, the page number 904, and the authority 905 as information elements.

The user name 902, the day and time 903, the page number 904, and the authority 905 are generated by correlating by the information element corresponding part 2120, as well as the process shown in FIG. 12. Similarly, the page information is correlated to the page information 460.

The information element corresponding to the file name 901 is not stored in either the input reference information 450 or the parameter storage part 209. Therefore, the element input value generation part 2124 correlates a value input by the input part of the MFP 1 to the file name 901.

In the example shown in FIG. 13, the file name 21 included in the value 20 being input is correlated to the file name 901. By the above-mentioned correlating, the output reference information 900 is generated and correlated to the page information 910 so that the image information is generated.

The input part configured to input the value of the information element of the output reference information 900 may be an input part provided at the local UI 208 of the MFP 1 or an input part of the personal computer PC0 through PCn connected to the MFP 1 by the communication server 207.

In addition, the process part 212, in a case where there is no corresponding information element, may be notified by the control part 202 that there is no corresponding information element. In the case where there is no corresponding information element, the corresponding information element may be formed by forming a screen encouraging input of the value of the information element by the element value input screen generation part 2011 or by instructing the process part of the logic part 203 to generate the screen encouraging input of the value of the information element.

The element value input screen generation part 2011 send the instruction to display the screen encouraging the input of the value of the information element to the personal computers PC0 through PC1 connected to the MFP 1 via the local UI 201 or the communication server 207. As a result of this, the screen is displayed so that the operator can input the value of the information element.

(Flow of Image Processing Method)

Figure 14:
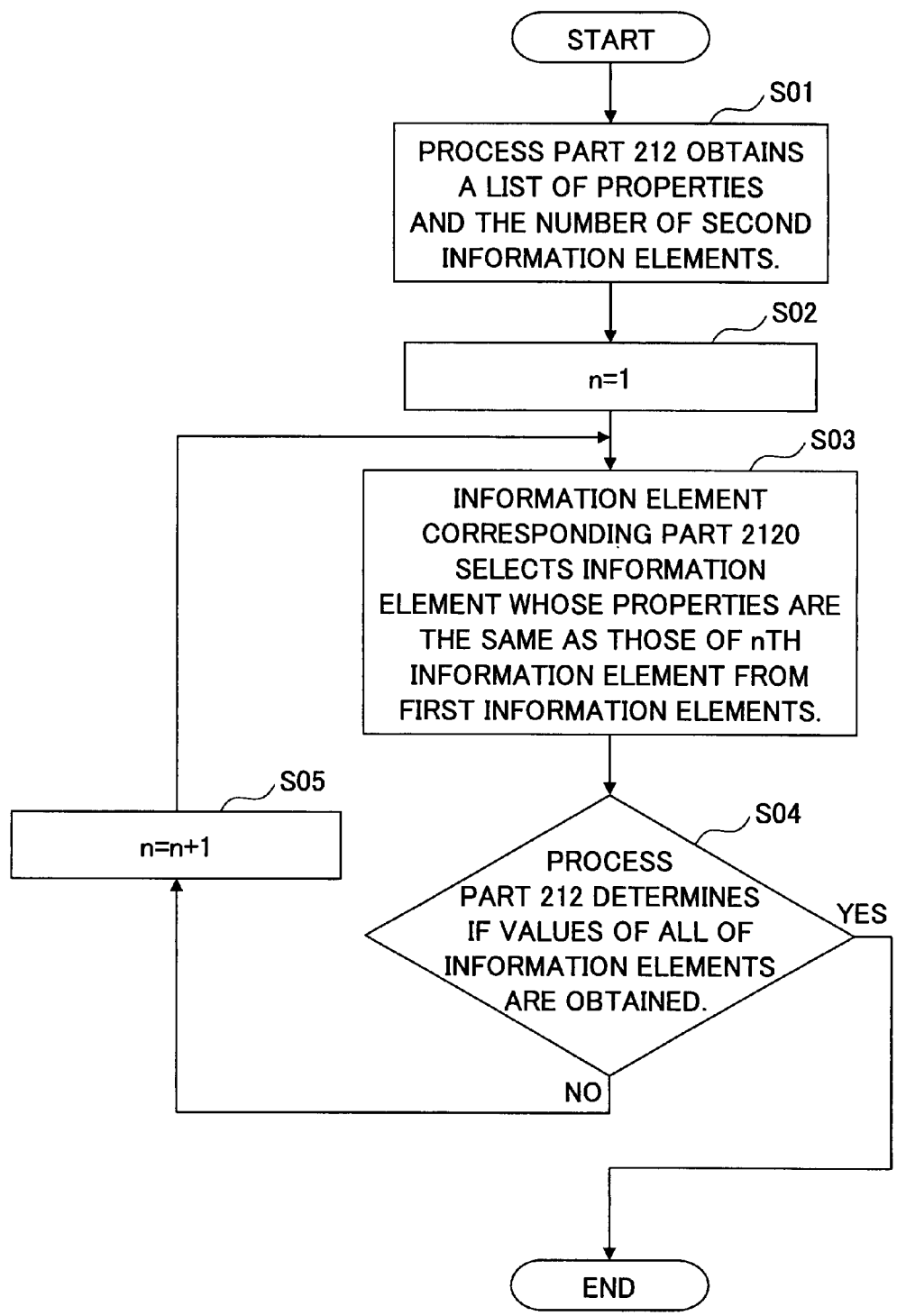
FIG. 14 is a flowchart for explaining an image processing method of an embodiment of the present invention.

FIG. 14 is a flowchart for explaining an image processing method of the embodiment of the present invention. In the example shown in FIG. 14, the process part 212 generates second image information based on correlating of the first information element to the second information element.

In step S01, the process part 212 obtains a list of properties and the number of second information elements. In step S02, the process part 212 implements initialization of the processing process so that a counter is set to be "1".

In step S03, the information element corresponding part 2120 selects an information element whose properties are the same as those of nth information element from the first information elements so that the value of the selected information element is made to be the value of the nth information element.

In step S04, the process part 212 determines if values of all information elements are obtained. In a case where the values of all information elements are obtained, the process of this flow is ended. In a case where the values of all information elements are not obtained, the process goes to step S05.

In step S05, after the process part 212 increments by one the number of the counter, the process returns to step S03.

(Flow of Process for Obtaining Information Elements from the Status of the MFP 1)

Figure 15:
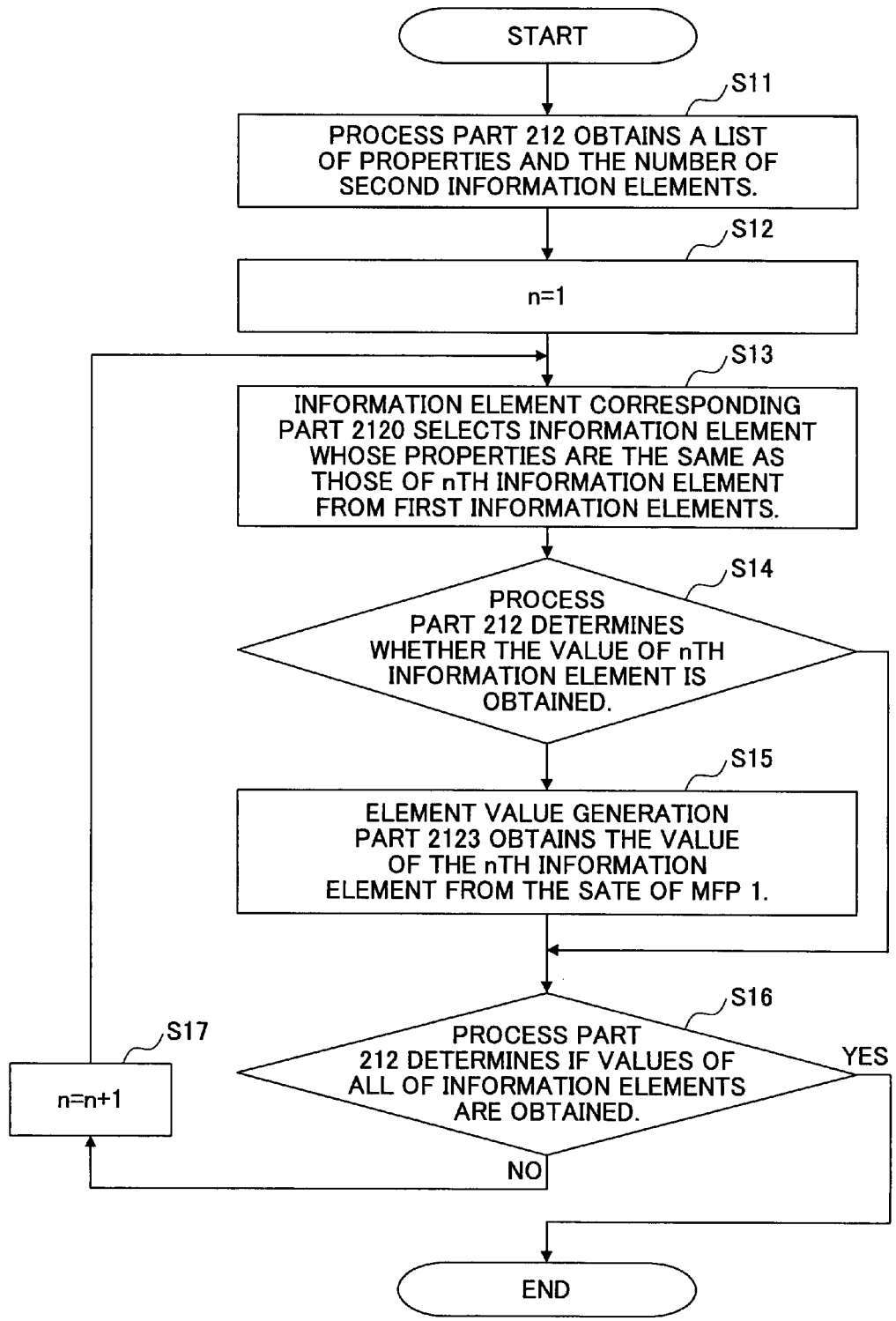
FIG. 15 is a flowchart of a process for obtaining information elements from the status of the MFP1.

FIG. 15 is a flowchart of a process for obtaining information elements from the status of the MFP1. In FIG. 15, step S11 through step S13 are the same as those in FIG. 14 and therefore explanation thereof is omitted.

In step S14, the process part 212 determines whether the value of nth information element is obtained. In a case where the value of nth information element is obtained, the process goes to step S16. In a case where the value of nth information element is not obtained, the process goes to step S15. What the value of nth information element not obtained in step S14 means is that there is no first information element having properties the same as that of the nth information element.

In step S15, the element value generation part 2123 obtains the value of the nth information element from the status of the MFP 1. The element value generation part 2123 obtains the day and time when the process is implemented from calendar or clock functions of the MFP 1 so that the day and time when the file is formed is generated.

In step S16, the process part 212 determines whether values of all information elements are obtained. In a case where the values of all information elements are obtained, the process of this flow is ended. In a case where the values of all information elements are not obtained, the process returns to step S17.

In step S17, after the process part 212 adds one to the number of the counter, the process goes to step S03.

(Flow of Process for Obtaining Information Elements from a Default Value Held by the MFP1)

Figure 16:
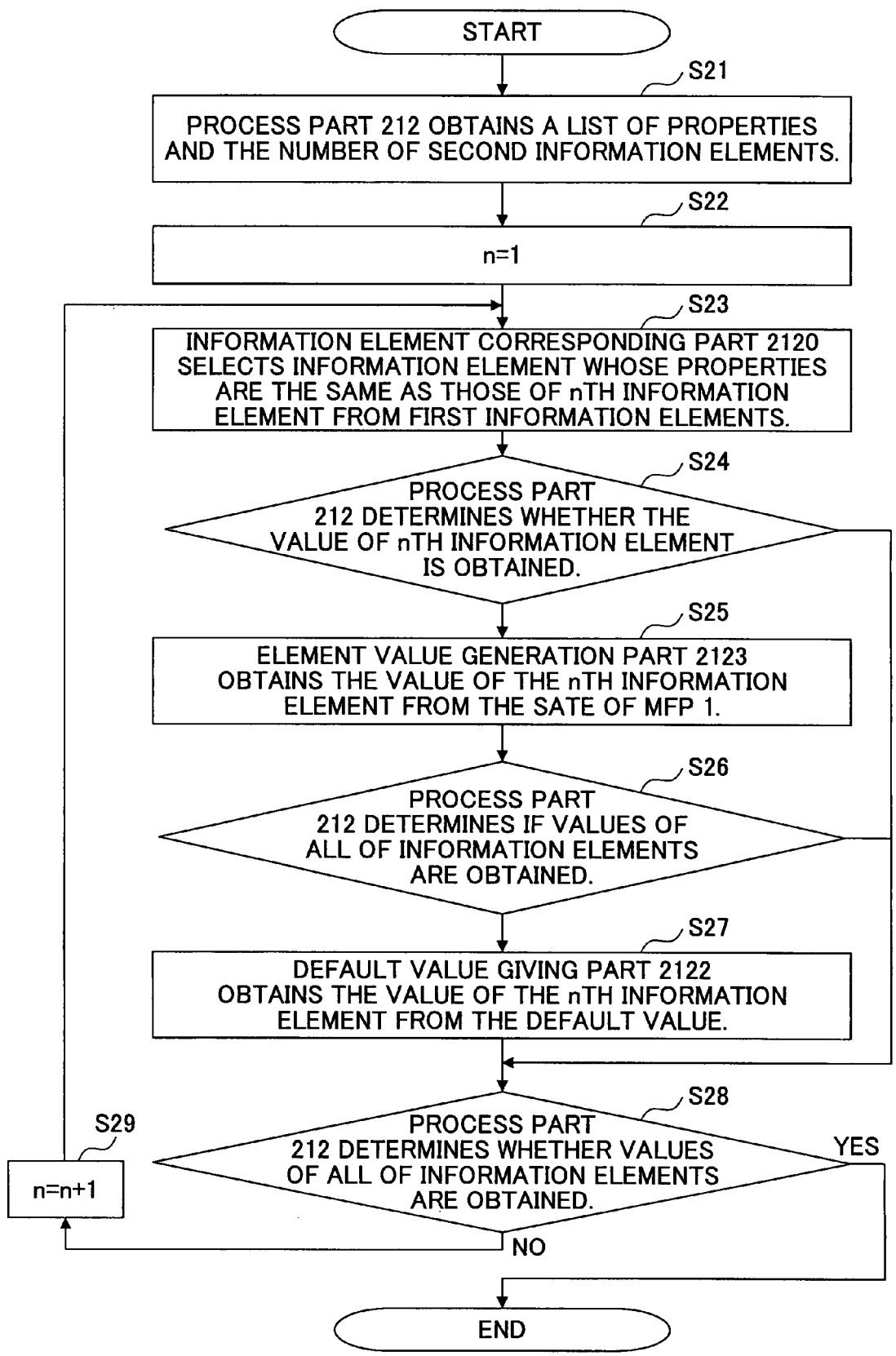
FIG. 16 is a flowchart of a process for obtaining information elements from a default value held by the MFP1.

FIG. 16 is a flowchart of a process for obtaining information elements by the process part 212 from a default value held by the MFP1. In FIG. 16, step S21 through step S25 are the same as those in FIG. 15 and therefore explanation thereof is omitted.

In step S26, the process part 212 determines whether the value of nth information element is obtained. In a case where the value of nth information element is obtained, the process goes to step S28. In a case where the value of nth information element is not obtained, the process goes to step S27. What the value of nth information element not obtained in step S26 means is that there is no first information element having properties same as that of the nth information element and the nth information element is not obtained from the status of the MFP 1. For example, the case where the value of the nth information element is not obtained may be generated in a case of the information element being the name of the person forming the image.

In step S27, the default value giving part 2122 obtains the value of the nth information element from the default value corresponding to the property of the information element stored in the parameter storage part 209.

In step S28, the process part 212 determines whether values of all information elements are obtained. In a case where the values of all information elements are obtained, the process of this flow is ended. In a case where the values of all information elements are not obtained, the process goes to step S29.

In step S29, after the process part 212 increments by one the number of the counter, the process returns to step S23.

(Flow of Process for Obtaining Information Elements from Input Value)

Figure 17:
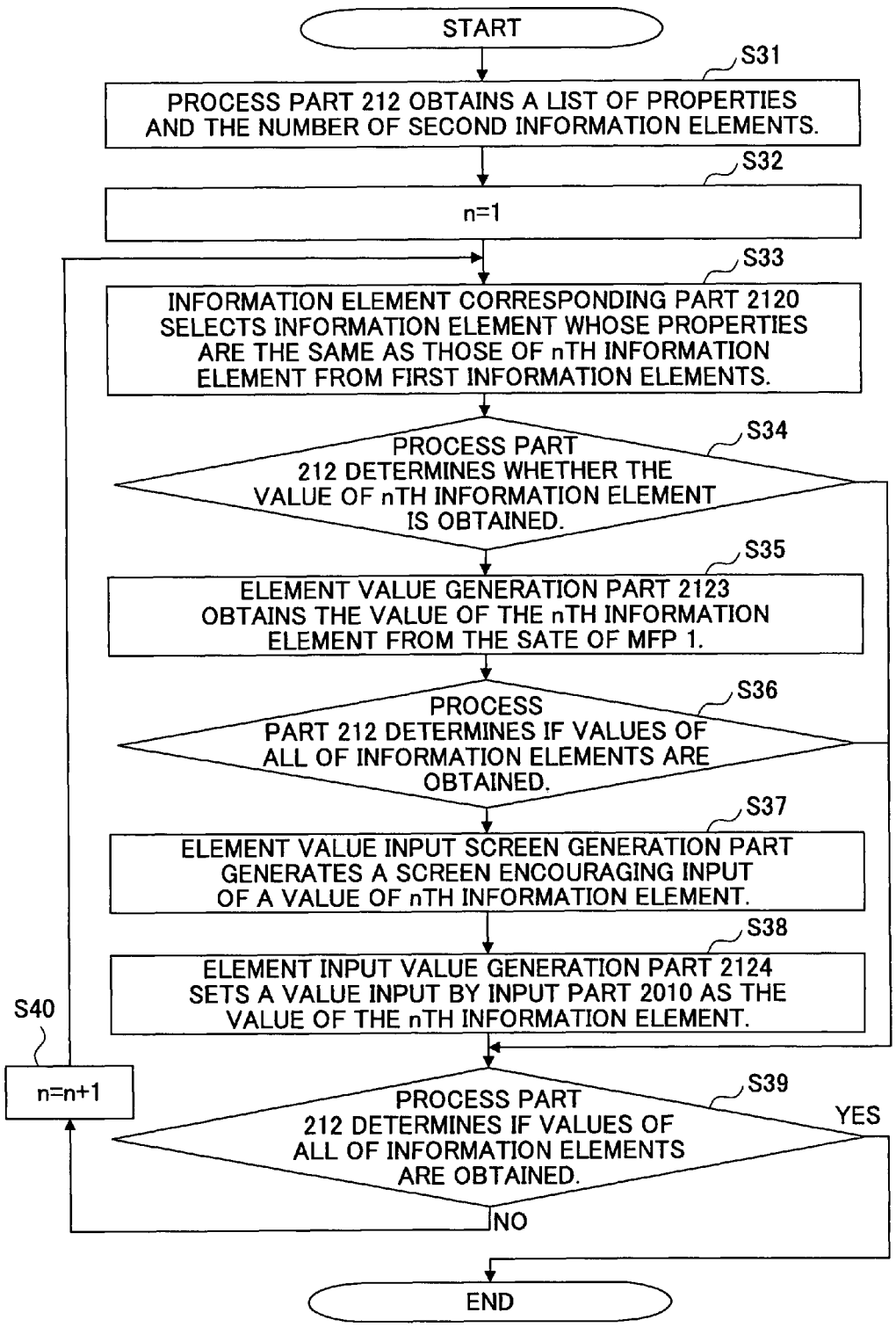
FIG. 17 is a flowchart of a process for obtaining information elements from an input value.

FIG. 17 is a flowchart of a process for obtaining information elements by the process part 212 from an input value. In FIG. 17, step S31 through step S36 are the same as those in FIG. 16 and therefore explanation thereof is omitted.

In step S37, the element value input screen generation part 2011 generates an input screen encouraging input of a value of nth information element.

After the input screen is displayed by a displaying part of the MFP 1 and the value is input from the input part 2010 by an operator, in step S38, the element input value generation part 2124 sets the value input by the input part 2010 as the value of the nth information element.

In step S39, the process part 212 determines whether values of all information elements are obtained. In a case where the values of all information elements are obtained, the process of this flow is ended. In a case where the values of all information elements are not obtained, the process goes to step S40.

In step S40, after the process part 212 increments by one the number of the counter, the process returns to step S33.

(Example of Reference Information)

FIG. 18 is a view showing an example of reference information described in data describing language of the image information processed by the image processing device or the image processing method of the embodiment of the present invention.

In the example shown in FIG. 18, an example of reference information having information elements of "filename", "username", "date", "pagenum" and "authority" as properties is shown. Tags of the properties are provided to values of each of the information elements.

In addition, the value having a tag of "image" is the file name of the page information corresponding to this reference information. The MFP 1 selects the information element having the same properties as those of the second information element by searching the image-tagged file.

(Block Diagram of a Computer Executing an Image Processing Program)

Figure 19:
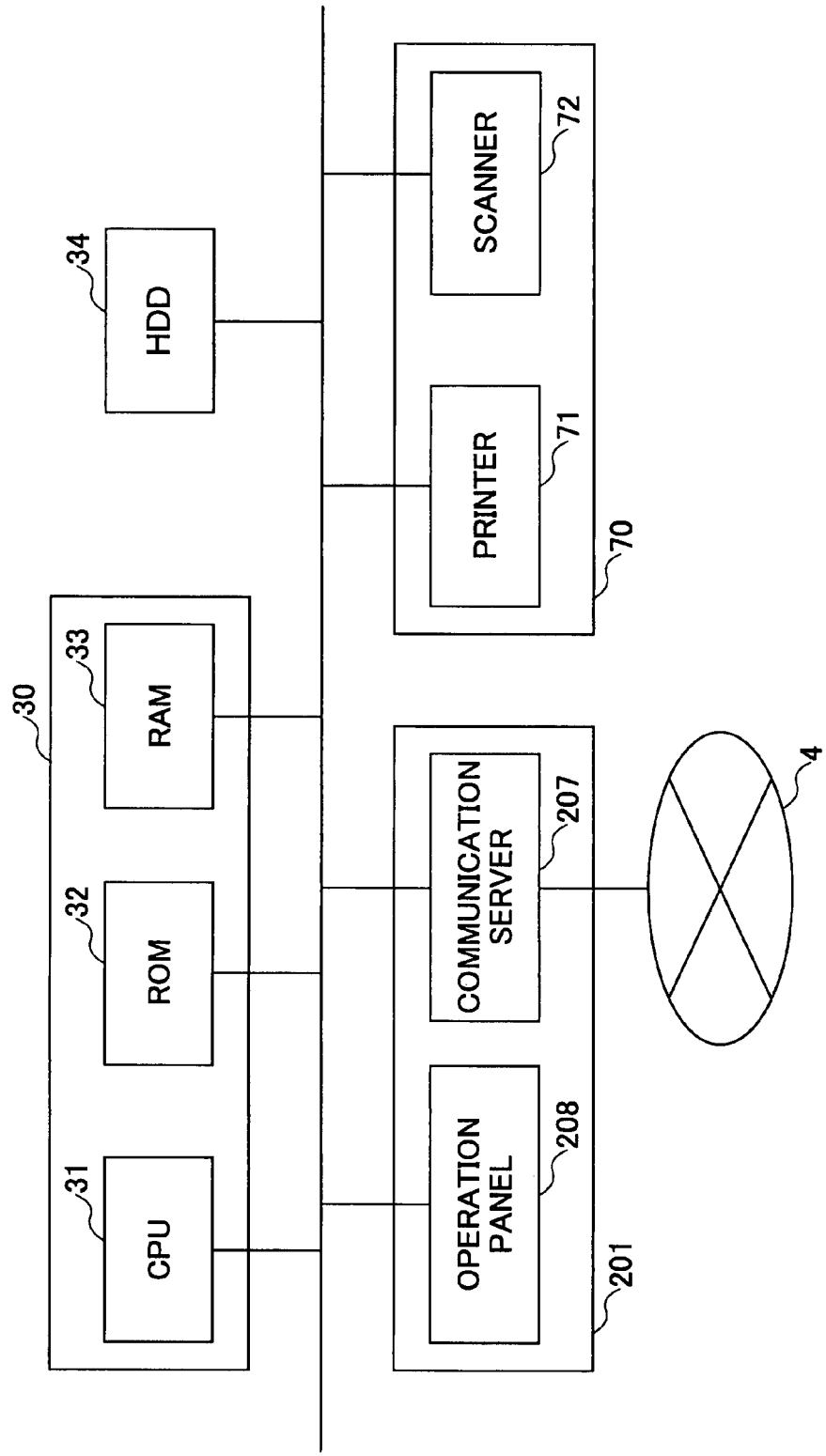
FIG. 19 is a block diagram showing an example of a computer executing an image processing program.

FIG. 19 is a block diagram showing an example of a computer executing an image processing program.

In the example shown in FIG. 19, the main processing part 30 of the computer controls and processed the interface part 201, the engine part 70, and others, so that the image processing method of the embodiment of the present invention is realized.

The main processing part 30 of the computer 30 includes the CPU 31, the ROM 32, and the RAM 33. The CPU 31 realizes the image processing method of the embodiment of the present invention by reading and executing the program stored in the ROM 32 and others. The ROM 32 is a memory storing the program and others executed by the CPU 31. The RAM 33 is a memory storing temporary data generated when the CPU 31 implements the process.

The main processing part 30 of the computer is connected to the interface part 201, the engine part 70, and the hard disk drive 34 via the local bus. The interface part 201 includes the communication server 207 and an operations panel 208 as a user I/F part.

Instruction is input to the operation panel 208 by the operator or the status of the MFP 1 is displayed in the operation panel 208. The communication server part 207 is an interface with the network 4. The communication server part 207 may be an interface part for connection not via the network but by such as the serial bus.

The engine part 70 includes each of the devices of the MFP 1 and has the printer 71 and the scanner 72. In addition, the hard disk drive 34 stores a large amount of data such as image data.

The image processing program of the embodiment of the present invention may be stored in the ROM 32 or the hard disk drive 34. The image processing program of the embodiment of the present invention may also be stored in a recording medium such as a CD-ROM or DVD, read by the device connected to the MFP 1 directly or via the network 4, or read by the CPU 31.

The present invention is not limited to these embodiments, but variations and modifications may be made without departing from the scope of the present invention.

Thus, according to the above-discussed embodiments of the present invention, it is possible to provide an image processing device, including: a processing part configured to process first image information so that second image information is generated; wherein the image information includes image data and reference information accompanying the image data; and the processing part correlates first reference information included in the first image information and second reference information included in the second image information, so that the first image information is processed and the second image information is generated.

According to the above-mentioned image processing device, even if data structures to be processed are changed or delivery of data is changed, it is possible to correspond to this.

The reference information may be formed by an information element formed by properties of the information element and a value; and the processing part may set a value of a first information element of the first reference information having the same properties as those of a second information element of the second reference information, to the second information element.

Thus, it is possible to provide an image processing device having the processing part configured to easily implement conversion between the image information having the different information elements.

The image processing device may further include an image information generation part configured to generate the image information related to an image processed by a first device; and a process data generation part configured to generate process data processed by a second device from the second image information.

Thus, it is possible to provide an image processing device configured to easily convert the image information between the devices when the image processed by one device is to be processed by other devices.

The image data of the image information may be formed as page information that is information of a page unit.

Thus, it is possible to provide an image processing device configured to easily convert the image information including the image data having the continuous plural pages.

The image processing device may further include a default value giving part configured to give a value held by the image processing device as a default value to the second information element in a case where the first information element corresponding to the second information element does not exist.

Thus, it is possible to provide an image processing device configured to prevent lack of the information element upon generation of the image information.

The image processing device may further include an element value generation part configured to generate the second information element in a case where the first information element corresponding to the second information element does not exist.

Thus, it is possible to provide an image processing device configured to form the value of the information element on generation of the image information.

The image processing device may further include an input part; and an element input value giving part configured to give an input value to be input by the input part as the second information element in a case where the first information element corresponding to the second information element does not exist.

Thus, it is possible to provide an image processing device wherein the operator inputs desirable information elements on generation of the image information.

The image processing device may further include an element value input screen generation part configured to generate a screen encouraging input of the value of the second information element in a case where the first information element corresponding to the second information element does not exist.

Thus, it is possible to provide an image processing device wherein the operator inputs desirable information elements on generation of the image information.

The image processing device may further include a process execution limitation part configured to limit execution of the process of the image processing device based on the value of the second information element.

Thus, it is possible to provide an image processing device configured to not perform improper operations when the value of the second information element is not normal.

The process execution limitation part may limit execution of a device processing process data generated from the image information including the information element in a case where the value of the second information element is not obtained.

Thus, it is possible to provide an image processing device configured to not perform improper operations when the value of the second information element is not obtained.

The image processing device may further include an interface part configured to input and output with outside; a control part configured to generate an execution instruction based on a signal being input from the interface part; a logic part configured to implement a process based on the instruction from the control part; a device part having a single device or plural devices; a device service part configured to divide signals between the logic part and the device part; and a cross-cut part configured to implement a process based on a signal indicating a status of the process or instruction from the interface part, the control part, the logic part, the device part, or the device service part; wherein the processing part is provided at the logic part and implements a process based on the instruction being input from the control part.

Thus, it is possible to provide an image processing device configured to efficiently use resources of the image processing device, convert between the plural image information items, and implement a request of the process being input.

The control part may include a parameter storage part configured to store a signal of a parameter being input from the interface part; and a process part selection part configured to select a process part provided at the logic part based on the parameter.

Thus, it is possible to provide an image processing device configured to efficiently implement the instruction of the process from the interface part.

The device part may include a device control part configured to control the device; and a device controlled by the device control part.

Thus, it is possible to provide an image processing device configured to process images in plural devices.

This patent application is based on Japanese Priority Patent Application No. 2006-94902 filed on Mar. 30, 2006, the entire contents of which are hereby incorporated by reference.

What is claimed is:

1. An image processing device, comprising:
    a processing part configured to process first image information so that second image information is generated;
    an image information generation part configured to generate the image information related to an image processed by a first device;
    a process data generation part configured to generate process data processed by a second device from the second image information, wherein
        the first image information includes a first image data and a first reference information accompanying the first image data, the first reference information including a first information element formed by properties of the first information element and a first value, and
        the processing part being further configured to correlate the first reference information included in the first image information and a second reference information included in the second image information, so that the first image information is processed and the second image information is generated, the processing part being further configured to set the first value of the first information element of the first reference information to equal a second information element of the second reference information, the first information element of the first reference information having the same properties as those of the second information element of the second reference information; and
    an element value input part configured to receive input of the value of the second information element in a case where the first information element corresponding to the second information element does not exist.

2. The image processing device as claimed in claim 1, wherein the image data of the image information are formed as page information that is information of a page unit.

3. The image processing device as claimed in claim 1, further comprising:
    a default value giving part configured to give a value held by the image processing device as a default value to the second information element in a case where the first information element corresponding to the second information element does not exist.

4. The image processing device as claimed in claim 3, further comprising:
    a process execution limitation part configured to limit execution of the process of the image processing device based on the value of the second information element.

5. The image processing device as claimed in claim 4, wherein the process execution limitation part limits execution of a device processing process data generated from the image information including the information element in a case where the value of the second information element is not obtained.

6. The image processing device as claimed in claim 1, further comprising:
    an element value generation part configured to generate the second information element in a case where the first information element corresponding to the second information element does not exist.

7. The image processing device as claimed in claim 1, further comprising:
    an input part; and
    an element input value giving part configured to give an input value to be input by the input part as the second information element in a case where the first information element corresponding to the second information element does not exist.

8. The image processing device as claimed in claim 1, further comprising:
    an element value input screen generation part configured to generate a screen encouraging input of the value of the second information element in a case where the first information element corresponding to the second information element does not exist.

9. The image processing device as claimed in claim 1, further comprising:
    an interface part configured to input and output with outside;
    a control part configured to generate an execution instruction based on a signal being input from the interface part;
    a logic part configured to implement a process based on the instruction from the control part;
    a device part having a single device or plural devices;
    a device service part configured to divide signals between the logic part and the device part; and
    a cross-cut part configured to implement a process based on a signal indicating a status of the process or instruction from the interface part, the control part, the logic part, the device part, or the device service part;
    wherein the processing part is provided at the logic part and implements a process based on the instruction being input from the control part.

10. The image processing device as claimed in claim 9, wherein the control part includes
    a parameter storage part configured to store a signal of a parameter being input from the interface part; and
    a process part selection part configured to select a process part provided at the logic part based on the parameter.

11. The image processing device as claimed in claim 9, wherein the device part includes
    a device control part configured to control the device; and
    a device controlled by the device control part.

12. An image processing method, comprising:
    processing first image information so that second image information is generated, and a first value of a first information element of a first reference information being equal to a second information element of the second reference information, the first information element of the first reference information having the same properties as those of the second information element of a second reference information;

generating, by a first device, the image information related to the image processed;

generating, by a second device, process data processed from the second image information, wherein the first image information includes a first image data and a first reference information accompanying the first image data, the first reference information being formed by the first information element formed by properties of the first information element and the first value, and correlating the first reference information included in the first image information with the second reference information included in the second image information, so that the first image information is processed and the second image information is generated; and receiving, by an element value input part, input of the value of the second information element in a case where the first information element corresponding to the second information element does not exist.

13. The image processing method as claimed in claim 12, wherein the processing step includes:

obtaining a second value of the second information element; and limiting execution of the second device processing process data generated from the image information including the information element if the value of the second information element is not obtained in the information element obtaining step.

14. A non-transitory information storage medium that can be read by a non-transitory computer readable medium where an image processing program is stored, the image processing program configured to make the non-transitory computer readable medium implement an image processing method, the image processing method comprising:

a processing step of processing first image information so that second image information is generated;

generating, by a first device, the image information related to the image processed;

generating, by a second device, process data processed from the second image information, wherein the first image information includes image data and reference information accompanying the image data, and first reference information included in the first image information and second reference information included in the second image information are correlated in the processing step, so that the first image information is processed and the second image information is generated; and receiving, by an element value input part, input of the value of the second information element in a case where the first information element corresponding to the second information element does not exist.

\* \* \* \* \*